United States Patent
Bonawitz

(10) Patent No.: US 8,874,356 B1
(45) Date of Patent: Oct. 28, 2014

(54) METHODS AND SYSTEMS FOR DECOMPOSING FLEET PLANNING OPTIMIZATIONS VIA SPATIAL PARTITIONS

(71) Applicant: Keith Allen Bonawitz, Mountain View, CA (US)

(72) Inventor: Keith Allen Bonawitz, Mountain View, CA (US)

(73) Assignee: Google Inc., Mountain View, CA (US)

( * ) Notice: Subject to any disclaimer, the term of this patent is extended or adjusted under 35 U.S.C. 154(b) by 23 days.

(21) Appl. No.: 13/748,708

(22) Filed: Jan. 24, 2013

(51) Int. Cl.
G06Q 10/00 (2012.01)
G08G 5/00 (2006.01)

(52) U.S. Cl.
CPC ................ G08G 5/0034 (2013.01)
USPC .......................... 701/120; 709/201

(58) Field of Classification Search
USPC .......................... 701/120; 709/201
See application file for complete search history.

(56) References Cited

U.S. PATENT DOCUMENTS

| | | | |
|---|---|---|---|
| 6,167,263 A * | 12/2000 | Campbell | ............ 455/431 |
| 6,324,398 B1 | 11/2001 | Lanzerotti et al. | |
| 6,402,090 B1 | 6/2002 | Aaron | |
| 6,437,743 B1 | 8/2002 | Mintz et al. | |
| 6,507,739 B1 | 1/2003 | Gross et al. | |
| 6,611,755 B1 | 8/2003 | Coffee et al. | |
| 6,628,941 B2 | 9/2003 | Knoblach et al. | |
| 6,678,520 B1 | 1/2004 | Wang | |
| 7,046,934 B2 | 5/2006 | Badesh et al. | |
| 7,356,390 B2 | 4/2008 | Knoblach et al. | |
| 7,469,857 B2 | 12/2008 | Voss | |
| 7,512,462 B2 | 3/2009 | Nichols et al. | |
| 7,844,218 B2 | 11/2010 | Seligsohn et al. | |
| 7,946,533 B2 | 5/2011 | Goodzeit | |
| 8,116,763 B1 | 2/2012 | Olsen | |
| 8,238,903 B2 | 8/2012 | Korb et al. | |
| 8,260,485 B1 | 9/2012 | Meuth et al. | |
| 8,275,499 B2 | 9/2012 | Coulmeau et al. | |
| 2002/0077944 A1 | 6/2002 | Bly et al. | |

(Continued)

FOREIGN PATENT DOCUMENTS

FR 2972697 9/2012

OTHER PUBLICATIONS

"Fleet management with automatic vehicle location", by Hamlen, M.D., published May 20-22, 1986 (Motorola Inc., Mobile Products Division).

(Continued)

*Primary Examiner* — Mary Cheung
*Assistant Examiner* — Yuen Wong
(74) *Attorney, Agent, or Firm* — McDonnell Boehnen Hulbert & Berghoff LLP

(57) ABSTRACT

Example methods and systems for decomposing fleet planning optimizations via spatial partitions are described. An example method includes receiving information indicating a sequence of coverage requirements for a region over a period of time. The region is characterized by a plurality of landmarks and the period of time is divided into a plurality of phases. An individual coverage requirement indicates a desired number of vehicles of a plurality of vehicles for respective landmarks at a given phase. The method also includes dividing the region into a plurality of sub-regions, and determining sub-region fleet plans for the plurality of sub-regions based on estimates of one or more vehicles entering respective sub-regions and estimates of one or more vehicles leaving respective sub-regions. The method also includes combining the sub-region fleet plans to produce a fleet plan responsive to the sequence of coverage requirements for the region.

18 Claims, 14 Drawing Sheets

(56) References Cited

U.S. PATENT DOCUMENTS

| | | | |
|---|---|---|---|
| 2003/0040273 | A1 | 2/2003 | Seligsohn et al. |
| 2006/0167599 | A1 | 7/2006 | Boden et al. |
| 2007/0288132 | A1 | 12/2007 | Lam |
| 2008/0144884 | A1 | 6/2008 | Habibi |
| 2008/0155070 | A1* | 6/2008 | El-Damhougy et al. ...... 709/220 |
| 2009/0267740 | A1 | 10/2009 | Pizzuto |
| 2011/0147513 | A1 | 6/2011 | Surmont |
| 2012/0073682 | A1 | 3/2012 | Geneste |
| 2012/0215505 | A1 | 8/2012 | Srivastav |
| 2012/0256770 | A1 | 10/2012 | Mitchell |

OTHER PUBLICATIONS

"A Mobile Location—Based Vehicle Fleet Management Service Application", by Silva, A.P., published Jun. 9-11, 2003, IEEE.

A method for Balloon Trajectory Control, by Aaron, K.M. et al., Global Aerospace Corporation, published Jun. 21, 2008.

Path Planning for Autonomous Underwater Vehicles in Realistic Oceanic Current Fields: Application to Gliders in the Western Mediterranean Sea, by Garau B. et al., Journal of Maritime Research, vol. VI. No. II, pp. 5-22, 2009.

Real-time Trajectory Design for Unmanned Aerial Vehicles using Receding Horizon Control, by Yoshiaki Kuwata, Thesis submitted to the MIT Department of Aeronautics and Astronautics, Jun. 2003.

Swarm Intelligence in autonomous collective robotics: from tools to the analysis and synthesis of distributed control strategies, Alcherio Martinoli, Thesis, 1999.

Autonomous Underwater Vehicle Path Planning: A Comparison of A* and Fast Marching Method, Kevin DeMarco, available at http://www.kevindemarco.com/wp-content/uploads/2011/05/fmm_paper_revised.pdf, 2011.

Optimal AUV path planning for extended missions in complex, fast-flowing estuarine environments, Dov Kruger et al., 2007 IEEE Conference on Robotics and Automation, Apr. 2007.

* cited by examiner

METHODS AND SYSTEMS FOR DECOMPOSING FLEET PLANNING OPTIMIZATIONS VIA SPATIAL PARTITIONS

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable, and methods for planning such infrastructure are needed.

SUMMARY

In one example, a method is provided that comprises receiving information indicative of a sequence of coverage requirements for a region over a period of time. The region is characterized by a plurality of landmarks and the period of time is divided into a plurality of phases, and an individual coverage requirement is indicative of a desired number of vehicles of a plurality of vehicles for respective landmarks at a given phase. The method also comprises dividing the region into a plurality of sub-regions, and determining, by a processor, sub-region fleet plans for the plurality of sub-regions based on estimates of one or more vehicles entering respective sub-regions and estimates of one or more vehicles leaving respective sub-regions. A given sub-region fleet plan is indicative of one or more landmarks for one or more vehicles to travel to during one or more phases. The method also comprises combining, by the processor, the sub-region fleet plans to produce a fleet plan responsive to the sequence of coverage requirements for the region.

In another example, a computer readable storage medium having stored therein instructions, that when executed by a computing device, cause the computing device to perform functions is provided. The functions comprise receiving information indicative of a sequence of coverage requirements for a region over a period of time. The region is characterized by a plurality of landmarks and the period of time is divided into a plurality of phases, and an individual coverage requirement is indicative of a desired number of vehicles of a plurality of vehicles for respective landmarks at a given phase. The functions also comprise dividing the region into a plurality of sub-regions, and determining sub-region fleet plans for the plurality of sub-regions based on estimates of one or more vehicles entering respective sub-regions and estimates of one or more vehicles leaving respective sub-regions. A given sub-region fleet plan is indicative of one or more landmarks for one or more vehicles to travel to during one or more phases. The functions also comprise combining the sub-region fleet plans to produce a fleet plan responsive to the sequence of coverage requirements for the region.

In still another example, a system is provided that comprises at least one processor, and data storage comprising program instructions executable by the at least one processor to cause the at least one processor to perform functions. The functions comprise receiving information indicative of a sequence of coverage requirements for a region over a period of time. The region is characterized by a plurality of landmarks and the period of time is divided into a plurality of phases, and an individual coverage requirement is indicative of a desired number of vehicles of a plurality of vehicles for respective landmarks at a given phase. The functions also comprise dividing the region into a plurality of sub-regions, and determining sub-region fleet plans for the plurality of sub-regions based on estimates of one or more vehicles entering respective sub-regions and estimates of one or more vehicles leaving respective sub-regions. A given sub-region fleet plan is indicative of one or more landmarks for one or more vehicles to travel to during one or more phases. The functions also comprise combining the sub-region fleet plans to produce a fleet plan responsive to the sequence of coverage requirements for the region.

These as well as other aspects, advantages, and alternatives, will become apparent to those of ordinary skill in the art by reading the following detailed description, with reference where appropriate to the accompanying figures.

DETAILED DESCRIPTION

Figure 1:
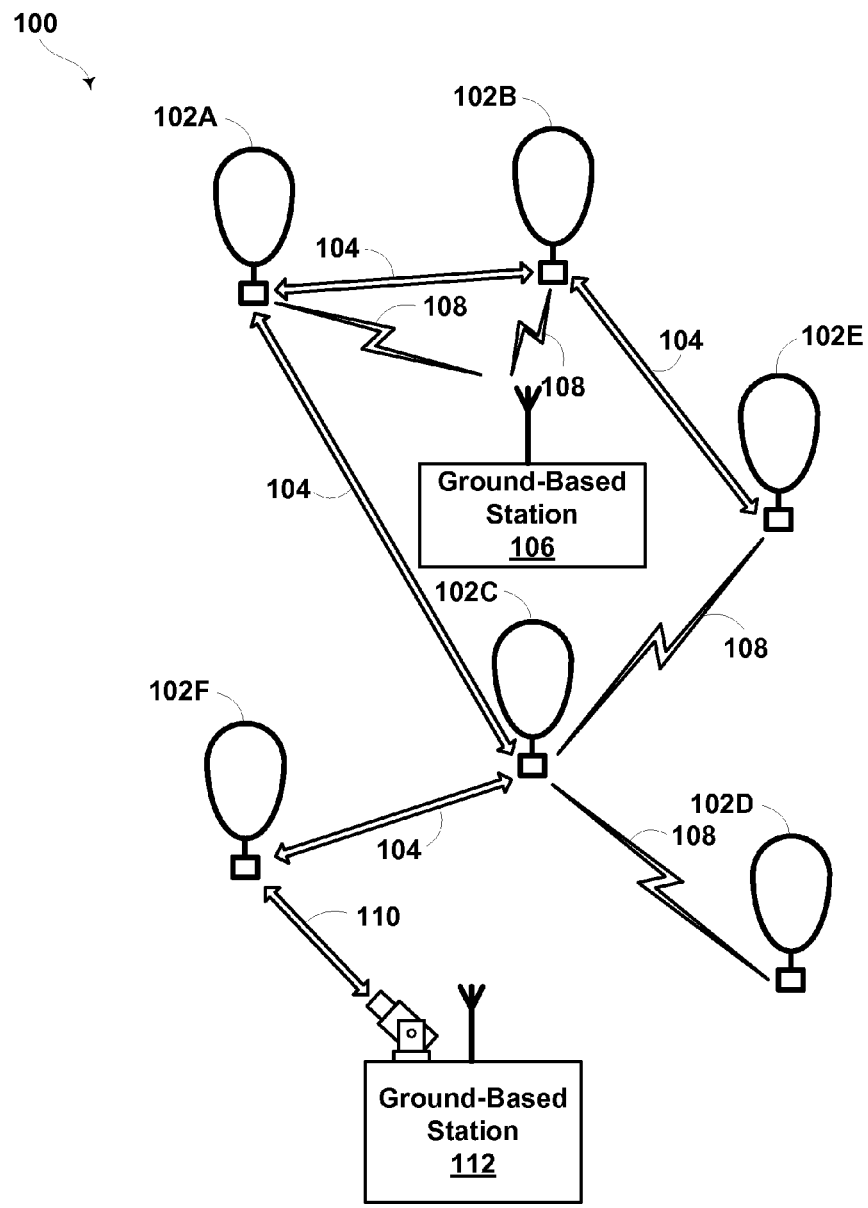
FIG. 1 is a block diagram illustrating an example balloon network.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Examples herein may be configured to provide control of vehicles within a fleet of vehicles. The vehicles may be any number of types of vehicles including, for example, autonomous or semi-autonomous vehicles, such as aerial vehicles, boats, underwater vehicles, satellites, aerostats, etc. for mapping/surveying, sensing, providing connectivity, etc. In other examples, methods described herein may be used to control or dispatch autonomous cars to maintain a well-distributed fleet of autonomous taxis in a city to support rapid dispatch of taxis. In still other examples, vehicles may include vehicles, mobile vehicles, objects, mobile elements, aerial platforms, or mobile objects within a fleet of vehicles.

In still further examples, vehicles may be or include vehicles of a data network that includes a plurality of balloons, for example, configured as a mesh network formed by high-altitude balloons deployed in the stratosphere. Since winds in the stratosphere may affect locations of the balloons in a differential manner, each balloon in an example network may be configured to change its horizontal position by adjusting its vertical position (i.e., altitude). For example, by adjusting its altitude, a balloon may be able find winds that will carry the balloon horizontally (e.g., latitudinally and/or longitudinally) to a desired horizontal location. In further examples, balloons may include propellers for horizontal thrust rather than (or in addition to) wind. Thus, in some examples, vehicles described herein may include powered or unpowered vehicles that are permitted to drift, and may include mechanisms for controlling a direction and/or speed of the vehicles.

Within examples, methods and systems are described with respect to vehicles of a fleet of vehicles being balloons in a fleet of balloons arranged as a data network. However, as mentioned above, methods and systems herein may be applicable to other types of vehicles or elements of a fleet of vehicles, and thus, examples described are not limiting.

In some examples, methods and systems for decomposing fleet planning optimizations via spatial partitions are described. An example method includes receiving information indicating a sequence of coverage requirements for a region over a period of time, and the region may be characterized by a plurality of landmarks and the period of time can be divided into a plurality of phases. An individual coverage requirement indicates a desired number of vehicles for respective landmarks at a given phase. The region may be divided into a sub-regions, and sub-region fleet plans can be determined based on estimates of vehicles entering and leaving respective sub-regions. A sub-region fleet plan may indicate landmarks for vehicles to travel to during phases. The sub-region fleet plans can be combined to produce a fleet plan responsive to the sequence of coverage requirements for the region.

Example methods may be executed to decompose vehicle fleet planning of trajectories of vehicles per sub-region, and then trajectories of vehicles across boundaries of sub-regions can be resolved. Planning in this manner may be performed more quickly than planning an entire region serially.

FIG. 1 is a block diagram illustrating an example balloon network 100. As shown, the balloon network 100 includes balloons 102A to 102F, which are configured to communicate with one another via free-space optical links 104. Configured as such, balloons 102A to 102F may collectively function as a mesh network for packet-data communications. Further, at least some of balloons 102A and 102B may be configured for RF communications with ground-based stations 106 via respective RF links 108, or for balloon-to-balloon RF communication. Yet further, some balloons, such as balloon 102F, may be configured to communicate via optical link 110 with ground-based station 112.

In an exemplary embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an exemplary embodiment, high-altitude balloons may be generally configured to operate in an altitude range within the stratosphere that has relatively low wind-speeds (e.g., at about 17.5 km to 20 km altitude, the global mean wind speed may reach about 30 to 35 mph for large portions of the year, while a max wind speed may be up to 200 mph; and at 26 km altitude, a global mean wind speed may reach about 60 to 65 mph and a max wind speed of about 300 mph).

More specifically, in a high-altitude-balloon network, balloons 102A to 102F may generally be configured to operate at altitudes between 18 km and 25 km (although other altitudes are possible). At such altitudes, for example, the layer of the stratosphere generally has relatively low wind speeds (e.g., winds between 5 and 20 mph) and relatively little turbulence. Further, while the winds between 18 km and 25 km may vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an exemplary embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers.

In a further aspect, balloons 102A to 102F may utilize one or more of various different RF air-interface protocols for communication with ground-based stations 106 via respective RF links 108. For instance, some or all of balloons 102A to 102F may be configured to communicate with ground-based station 106 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect in balloon network 100, balloon 102F is configured as a downlink balloon to provide a high-capacity air-ground link. Like other balloons in an exemplary network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and ground-based station 112.

Note that in some implementations, a downlink balloon 102F may additionally be operable for RF communication with ground-based station 106. In other cases, a downlink balloon 102F may only use an optical link for balloon-to-ground communications. Further, while the arrangement shown in FIG. 1 includes just one downlink balloon 102F, an exemplary balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104.

Ground-based stations, such as ground-based station 106 and/or 112, may include components such as transceivers, transmitters, and/or receivers for communication via RF links and/or optical links with a balloon network. Further, a ground-based station may use various air-interface protocols in order to communicate with a balloon 102A to 102F over an RF link. As such, a ground-based station 106 may be configured as an access point via which various devices can connect to balloon network 100.

In a further aspect, some or all balloons 102A to 102F could be configured to establish a communication link with space-based satellites in addition to, or as an alternative to, a ground-based communication link. In some embodiments, a balloon may communicate with a satellite via an optical link.

Further, some ground-based stations, such as ground-based station 106, may be configured as gateways between balloon network 100 and one or more other networks. Such a ground-based station 106 may thus serve as an interface between the balloon network and the Internet, a cellular service provider's network, and/or other types of networks.

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to the balloon and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an exemplary balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. For instance, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible.

In a further aspect, balloons in an exemplary balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, the same wavelength can be assigned for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath.

Further, various routing algorithms may be employed in an opaque configuration. For example, to determine a primary lightpath and/or one or more diverse backup lightpaths for a given connection, exemplary balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

In some examples, a balloon network 100 may have a non-uniform topology. For instance, exemplary embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

Figure 2:
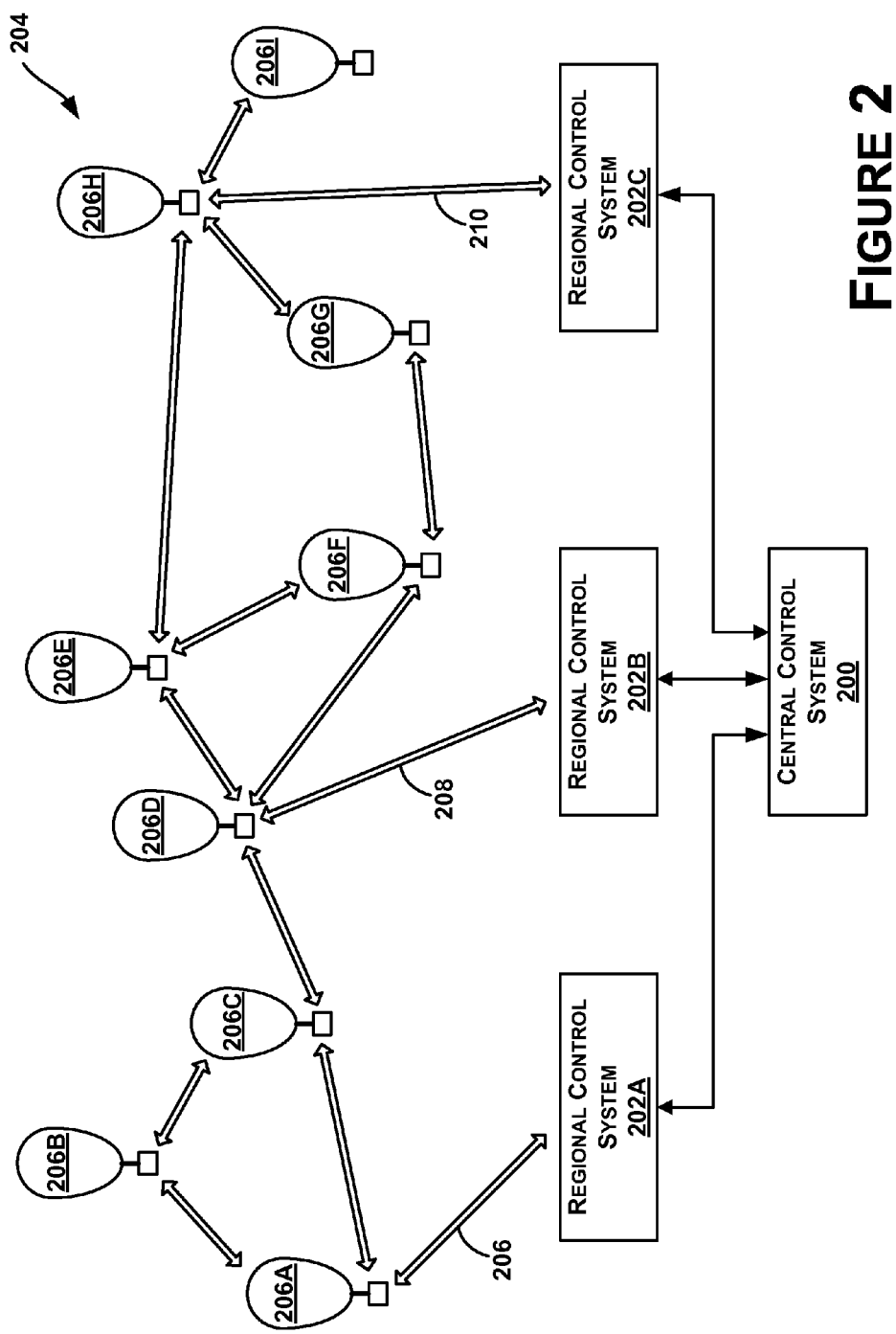
FIG. 2 is a block diagram illustrating an example balloon-network control system.

FIG. 2 is a block diagram illustrating an example balloon-network control system. In particular, FIG. 2 shows a distributed control system, which includes a central control system 200 and a number of regional control-systems 202A to 202C. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that the balloons cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 204A, 204D, and 204H are configured as downlink balloons. As such, regional control systems 202A to 202C may respectively communicate with balloons 204A, 204D, and 204H via optical links 206, 208, and 210, respectively.

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in the balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Figure 3:
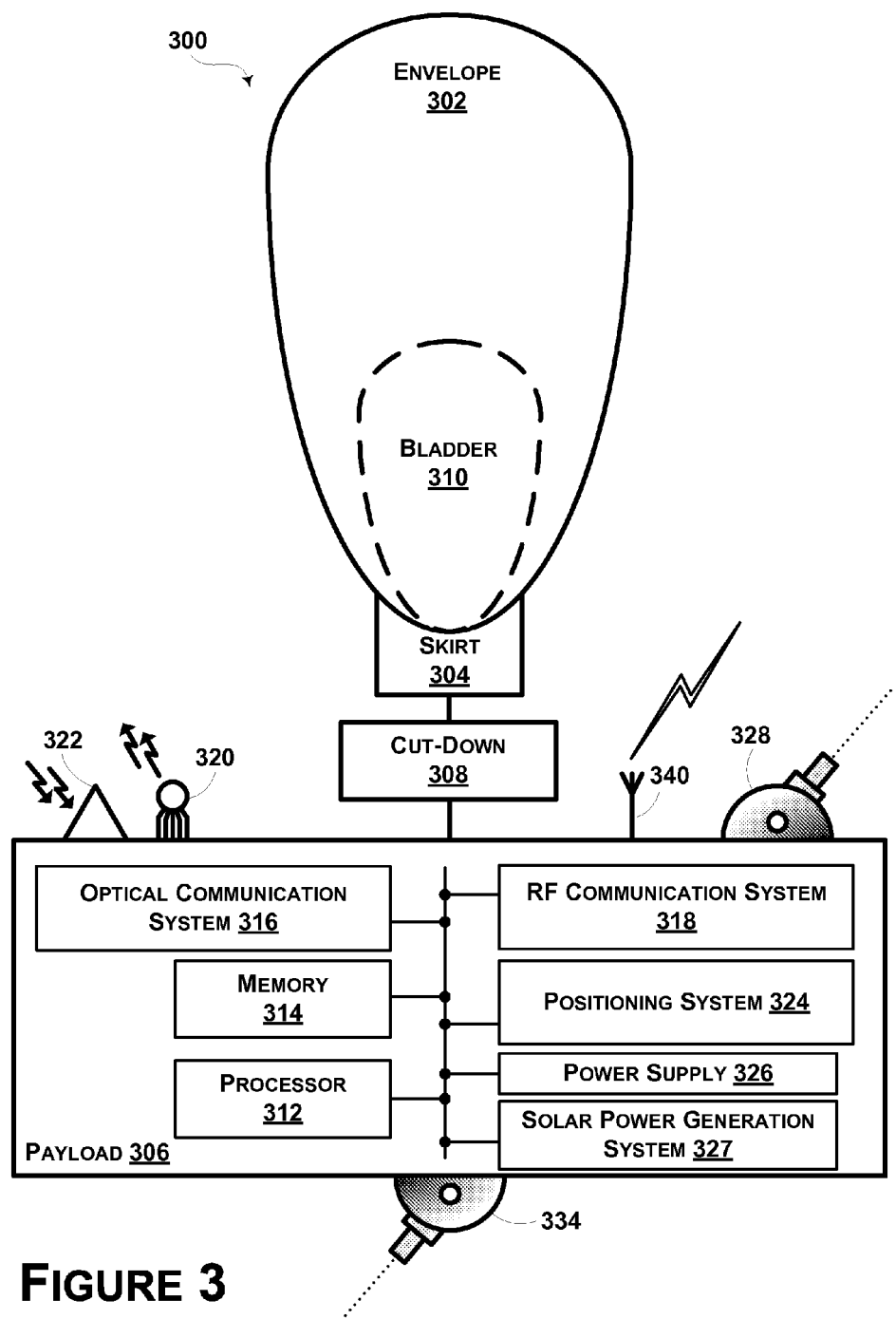
FIG. 3 shows a high-altitude balloon according to an example embodiment.

Various types of balloon systems may be incorporated in an exemplary balloon network. As noted above, an exemplary embodiment may utilize high-altitude balloons, which typically operate in an altitude range between 18 km and 25 km. FIG. 3 shows a high-altitude balloon 300, according to an exemplary embodiment. As shown, the balloon 300 includes an envelope 302, a skirt 304, a payload 306, and a cut-down system 308 that is attached between the balloon 302 and payload 306.

The envelope 302 and skirt 304 may take various forms, for instance, the envelope 302 and/or skirt 304 may be made of metalized Mylar or BoPet. Alternatively or additionally, some or all of the envelope 302 and/or skirt 304 may be constructed from a highly-flexible latex material or a rubber material such as chloroprene. Further, the shape and size of the envelope 302 and skirt 304 may vary depending upon the particular implementation. Additionally, the envelope 302 may be filled with various different types of gases, such as helium and/or hydrogen.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein.

The payload 306 of balloon 300 may also include various other types of equipment and systems to provide a number of different functions. For example, payload 306 may include optical communication system 316, which may transmit optical signals via an ultra-bright LED system 320, and which may receive optical signals via an optical-communication receiver 322 (e.g., a photo-diode receiver system). Further, payload 306 may include an RF communication system 318, which may transmit and/or receive RF communications via an antenna system 340. The payload 306 may further include a positioning system 324 that can include a GPS or other location-based sensors.

The payload 306 may also include a power supply 326 to supply power to the various components of balloon 300. The power supply 326 may include or take the form of a rechargeable battery. In addition, the balloon 300 may include a solar power generation system 327. The solar power generation system 327 may include solar panels and could be used to generate power that charges and/or is distributed by the power supply 326.

Further, payload 306 may include various types of other systems 328 and sensors 334. For example, payload 306 may include one or more video and/or still cameras, a GPS system, various motion sensors (e.g., accelerometers, gyroscopes, and/or compasses), and/or various sensors for capturing environmental data. Further, some or all of the components within payload 306 may be implemented in a radiosonde, which may be operable to measure, e.g., pressure, altitude, geographical position (latitude and longitude), temperature, relative humidity, and/or wind speed and/or direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in envelope 302.

In an exemplary embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter than air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, various contemplated embodiments, altitude control of balloon 300 could be achieved, at least in part, by adjusting the rotation of the balloon with respect to the sun.

Further, a balloon 300 may include a navigation system (not shown). The navigation system may implement stationkeeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location.

Alternatively, the altitudinal adjustments may be computed by a ground-based control system and communicated to the high-altitude balloon. As another alternative, the altitudinal adjustments may be computed by a ground-based or satellite-based control system and communicated to the high-altitude balloon. Furthermore, in some embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. This functionality may be utilized anytime the payload needs to be accessed on the ground, such as when it is time to remove balloon 300 from a balloon network, when maintenance is due on systems within payload 306, and/or when power supply 326 needs to be recharged or replaced.

In an exemplary embodiment, the cut-down system 308 may include a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302. Other types of cut-down systems and/or variations on the illustrated cut-down system 308 are possible as well.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it theoretically does not need to be accessed on the ground. In yet other embodiments, balloons may be serviced in-flight by specific service balloons or another type of service aerostat or service aircraft.

As described, movement and locations of balloons can vary since winds in the stratosphere may affect the locations of the balloons in a differential manner. A balloon in an example network may be configured to change its horizontal position by adjusting its vertical position (i.e., altitude). For example, by adjusting its altitude, a balloon may be able find winds that will carry the balloon horizontally (e.g., latitudinally and/or longitudinally) to a desired horizontal location. Wind speed varies with altitude, and since current wind speeds as well as weather forecasts are available, in principle, a balloon may be directed to a location by identifying an altitude at which a wind direction takes a balloon to along a desired trajectory. However, a balloon without other forms of propulsion may be constrained to follow the wind and there may not be a single altitude with winds taking the balloon along the desired trajectory. In addition, to control a fleet of balloons, movement of the balloons should occur from one location above the surface of the Earth to another in a predictable manner.

In some instances, when managing a large fleet of balloons or other autonomous or semi-autonomous vehicles, it may be difficult to manage where each vehicle will go. Instead, a fleet administrator may have goals that the fleet is directed to satisfy, such as six hours from now, provide at least ten vehicles in area A, five vehicles in area B, eighteen vehicles in area C, etc. Following, at twelve hours from now, provide five vehicles in area A, and ten vehicles in area B and twenty vehicles in area C, etc. Subsequently, eighteen hours from now, still further changes may be desired.

Translating goals or sequences of coverage requirements into trajectories or paths for each vehicle to follow may include considering a starting location of a vehicle, from a starting location a determination of which vehicles can reach a goal area by a deadline for a first set of goals (e.g., six hours from now), from a location at the first deadline a determination of which vehicles can reach goal areas for a deadline for a second set of goals, and so on.

Within examples considering a fleet of balloons, for each balloon in a fleet of balloons, path planning may be performed to determine of all locations the balloon may traverse, a location where the balloon should traverse to satisfy a goal. A next location or set of available tasks for a balloon is dependent on a task previously achieved (i.e., where a balloon can travel to next is dependent on where the balloon is coming from).

In some instances, the fleet planning may include staging balloons so as to maneuver a balloon into a location ahead of a deadline from which the balloon will be able to arrive at the deadline goal on time. Staging requirements may require a balloon to take a trajectory that does not contribute usefully to goals during, for example, the first and second deadlines so that the balloon can reach a desired target area for a subsequent deadline. Such long-range planning may be useful for goal areas spread non-uniformly throughout a coverage area of a fleet, and when there are large regions (relative to a maximum range of a vehicle between deadlines) requiring few or no goals, but which are traversed to satisfy the coverage areas. In one example, for a goal distribution encompassing the world that is proportional to population density, there are no people in the oceans, and few people on many parts of land, and many people in major cities, and thus, world fleet planning may be performed according to a non-uniform distribution.

In some examples, fleet planning may be divided into a set of sub-problems that can be solved independently and solutions recombined to produce an overall solution. For worldwide balloon fleet planning, the Earth may be divided into regions, and for each region, an estimate for a number of balloons flowing into and out of a region may be determined. For a given problem or request, such as X balloons at location A, Y balloons at location B, and Z balloons at location C, the request may be divided into sub-parts (e.g., a first sub-part may include X balloons at location A, a second sub-part may include Y balloons at location B, and a third sub-part may include Z balloons at location C). In other examples, a first sub-part may include a portion of traveling from location A to location A1, a second sub-part may include traveling from location A1 to location A2, and a third sub-part may include traveling from location A2 to location B. Each sub-part may identify landmarks within regions that are spatially contiguous, such that locations A and B are adjacent or are within adjacent regions and locations B and C are adjacent or are within adjacent regions.

Each sub-part may be independently solved or optionally solved in parallel, and solutions of sub-parts can be combined into an overall solution to the request. One way to recombine solutions includes providing solutions of the sub-parts as initializations to a linear program solver for the full original request.

A sub-part captures a flow from the original problem within a spatial region described by a subset of landmarks. In the original problem, there may be vehicles flowing from outside regions into a selected subset, as well as vehicles that flow from the selected subset to outside regions, and thus, additional variables and constraints can be provided around a border of a region subset. All regions that share a possible path with a region in the set, as well as all flow variables for those possible paths can be determined. Constraints can be added to reflect an estimate of how many vehicles might be expected to traverse those paths. These estimates might be derived from a corpus of solutions to full scale fleet planning problems. The constraints can limit the flows to be within the bounds of expectation.

Figure 4A:
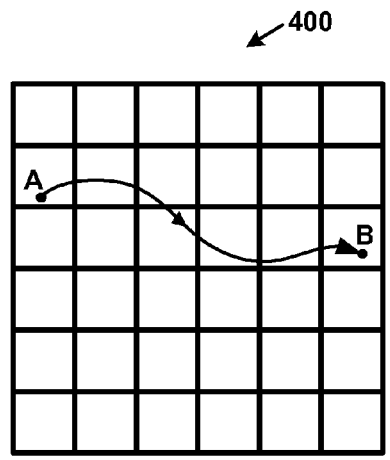
FIG. 4A illustrates a conceptual region divided into a grid of cells or sub-regions and a conceptual path for a vehicle through the region.

FIG. 4A illustrates a conceptual region 400 divided into a grid of cells or sub-regions and a conceptual path for a vehicle through the region 400. For example, the region 400 is divided into a grid of cells (e.g., 6 by 6 grid of cells). The region 400 may be divided into any number of regions, and each region may be of equal size or regions may be of various sizes. A balloon, or group of balloons, may initially be at a location labeled as A and a location labeled as B may be the desired destination. In addition, a trajectory as shown in FIG. 4A may be desired in order to satisfy a sequence of coverage requirements throughout the region 400 over time.

For fleet planning, regions of an area (e.g., cells) may be characterized by landmarks or locations which a balloon can reach over a given time. A fleet plan may be determined at any time increment to determine a location where balloons need to be at such a time to satisfy a given goal, and then, fleet plans can be solved backward in time to determine locations at previous legs of a fleet plan.

To determine which balloons to instruct to traverse across the region 400, and to determine how to instruct the balloons (e.g., which path to travel), initially, fleet plans of one or more (or in some examples, of each) sub-region can be determined. To do so, estimates for a number of balloons that may enter the sub-region and estimates of a number of balloons that may leave a sub-region during respective time intervals can be determined.

Figure 4B:
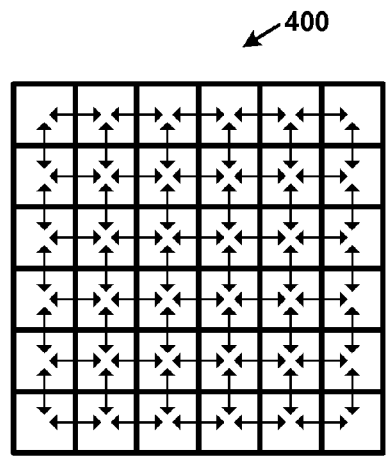
FIG. 4B illustrates the region of FIG. 4A and example paths that a balloon may take across boundaries.

FIG. 4B illustrates the region 400 and example paths that a balloon may take across boundaries. In this example, a balloon may be constrained to travel to an immediate neighbor region during a time interval. In addition, for each time interval, a balloon may travel so as not to remain within a region during time intervals. The arrows shown in FIG. 4B represent that balloons may travel from one sub-region to any adjacent sub-region within the region 400.

In other examples, a balloon may not be constrained to only travel to immediate or adjacent sub-region neighbors during a time interval. Depending on a length of the time interval or a size of the sub-region, the balloon may be able to travel to other sub-regions as well.

Sub-regions may be characterized by a number of landmarks (not shown), and paths of balloons through the sub-regions can be determined based on which landmarks balloons may travel to during a time interval. After determining a fleet plan for a given sub-region that indicates paths for balloons of a fleet of balloons to travel based on received coverage requirements, sub-region fleet plans can be determined for all sub-regions. In some examples, sub-region fleet plans for all sub-regions may be determined in parallel.

Figure 4C:
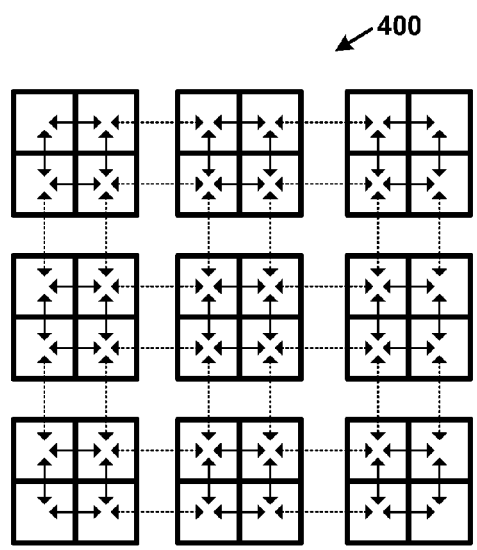
FIG. 4C illustrates the region of FIG. 4A divided into nine sub-regions, and each sub-regions includes four cells.

FIG. 4C illustrates the region 400 divided into nine sub-regions, and each sub-regions includes four cells. Paths of balloons within the sub-regions can be determined (e.g., to determine which adjacent neighbor cell that the balloon travels to) using any number of examples methods, as described below with reference to FIGS. 5-13. Following, the sub-region plans may be combined to produce a fleet plan responsive for the region 400. To combine sub-region fleet plans, paths across boundaries of sub-regions are resolved. In FIG. 4C, dotted arrows illustrate example paths across boundaries of sub-regions. When combining sub-region fleet plans, a conflict may be present between a number of balloons entering a sub-region and a number of balloons leaving a sub-region across a boundary.

Figure 4D:
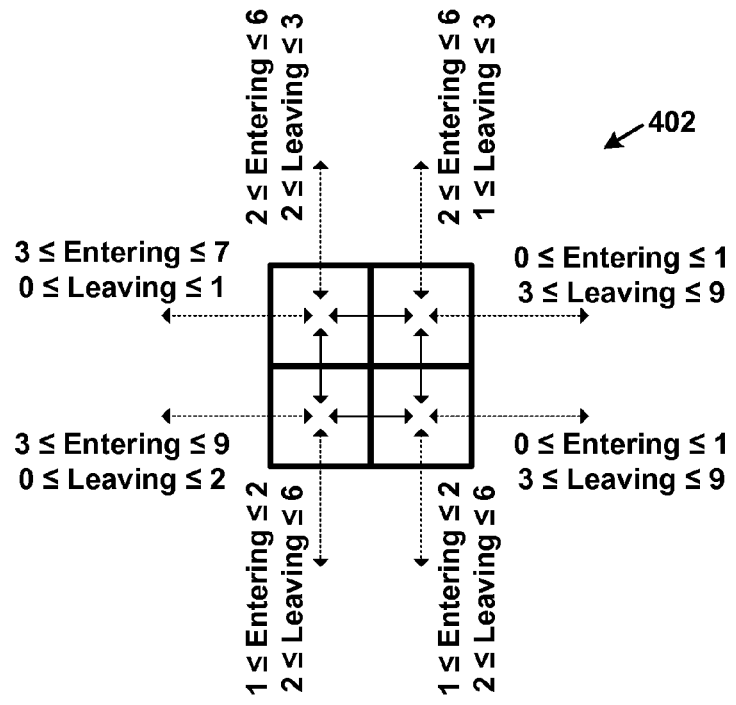
FIG. 4D illustrates an example sub-region, and an example conceptual method for determining a fleet plan for the sub-region.

FIG. 4D illustrates an example sub-region 402, and an example conceptual method for determining a fleet plan for the sub-region 402. Constraints may be placed on a number of balloons that can enter or leave a cell of the sub-region 402 so as to lower the chances of a conflict across boundaries of sub-regions. For example, for a top-left cell of the sub-region 402, paths of balloons may be constrained such that a number of balloons entering the cell are between 3-7, and a number of balloons leaving the cell is between 0-1. Constraints may be determined based on past experiences or by taking averages of a number of balloons that have entered the sub-region 402 over the past few time intervals. Using historical information, it may be determined that in a geographic area represented by the cell, on average about 3-7 balloons traverse into the cell.

Figure 4E:
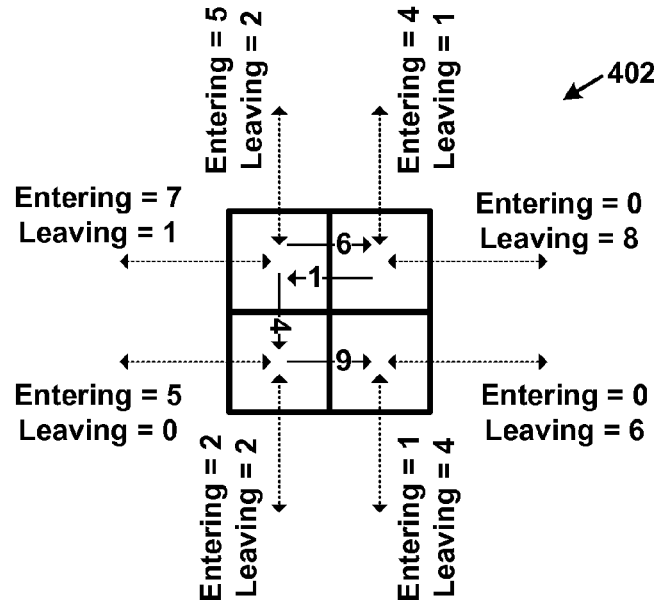
FIG. 4E illustrates an example fleet plan for the sub-region of FIG. 4D.

FIG. 4E illustrates an example fleet plan for the sub-region 402 of FIG. 4D. Using the constraints shown in FIG. 4D, paths of balloons within the sub-region 402 can be determined (e.g., using a linear program or minimum cost flow, as described below). In the example shown in FIG. 4E, estimates of a number of balloons entering and leaving each cell are determined, and estimates for a number of balloons traveling to an adjacent cell are also shown with arrows.

Figure 4F:
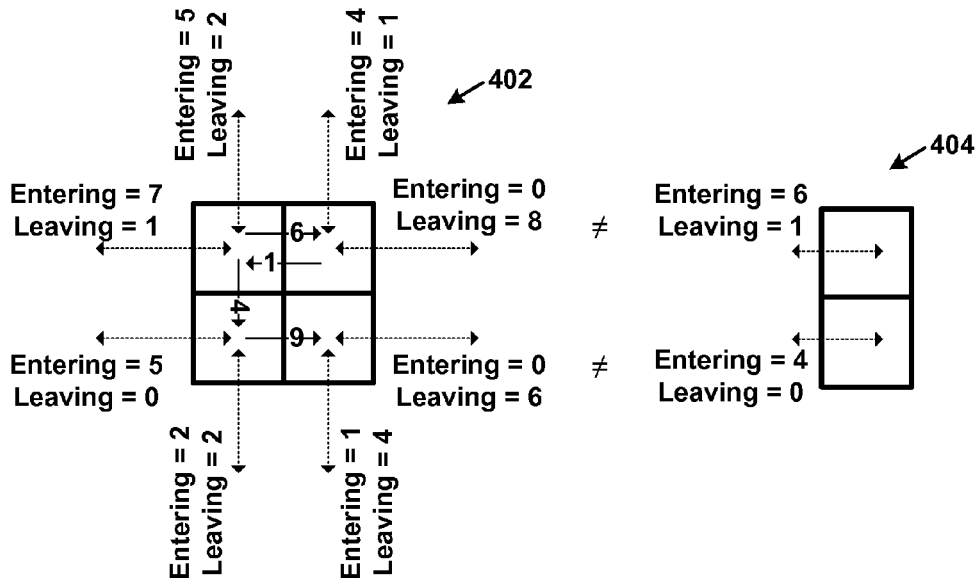
FIG. 4F illustrates an example merge of fleet plans across boundaries of sub-regions.

FIG. 4F illustrates an example merge of fleet plans across boundaries of sub-regions. The fleet plan of sub-region 402 is shown, and a fleet plan for a neighboring sub-region 404 is also shown. In this example, estimates for a number of balloons entering and leaving cells across the boundary do not match, and thus, a conflict is present. In some examples, a number of balloons leaving and entering a cell may be maintained as variables, and values for the variables for each sub-region 400 and 402 may be maintained when combining the fleet plans. A constraint can be added requiring the variables to be equal, and a number of iterations of a linear program can be performed to determine a value at which the variables converge.

Figure 4G:
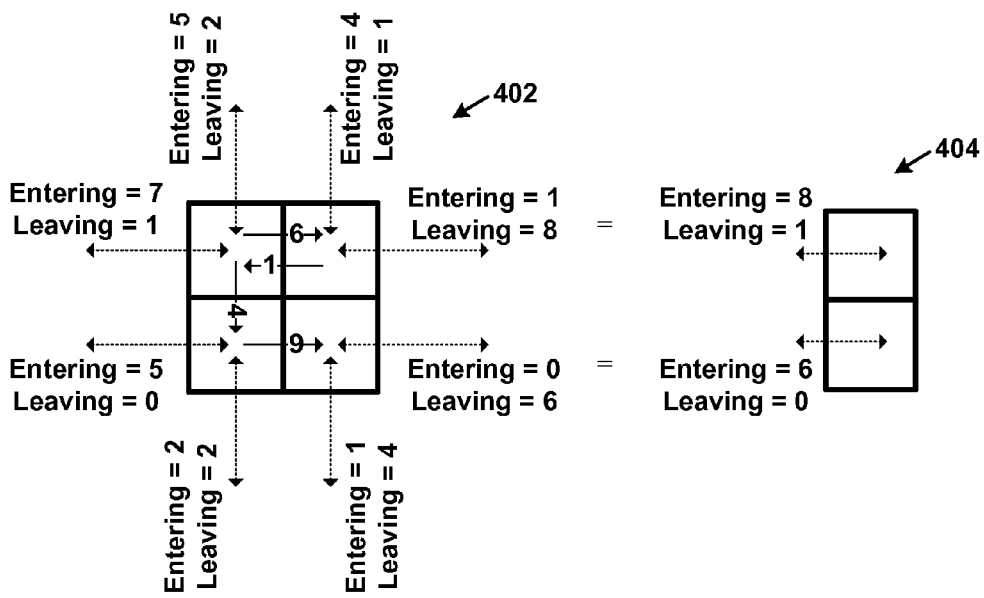
FIG. 4G illustrates an example solution of a merge of fleet plans for the sub-regions of FIG. 4F.

FIG. 4G illustrates an example solution of a merge of fleet plans for the sub-regions 402 and 404. In this example, a number of balloons entering a top-right cell of sub-region 402 is set equal to a number of balloons leaving the top cell of sub-region 404, and a number of balloons entering the top cell of sub-region 404 is set equal to a number of balloons leaving the top-right cell of sub-region 402. Similar solutions are found for the merge across the bottom cells of the sub-regions. In some examples, since there are two values representing the same variable (e.g., number of balloons traversing a boundary represented by a number of balloons entering one cell and a number of balloons leaving another cell), one value may be chosen (e.g., arbitrarily) in a way to make the values agree, which will also make some other constraint disagree. In other examples, a smaller of the estimates may be taken across boundaries of adjacent sub-regions. For disagreements between constraints, the linear program solver (described below) can be executed using values of the variables as initial guesses.

Figure 4H:
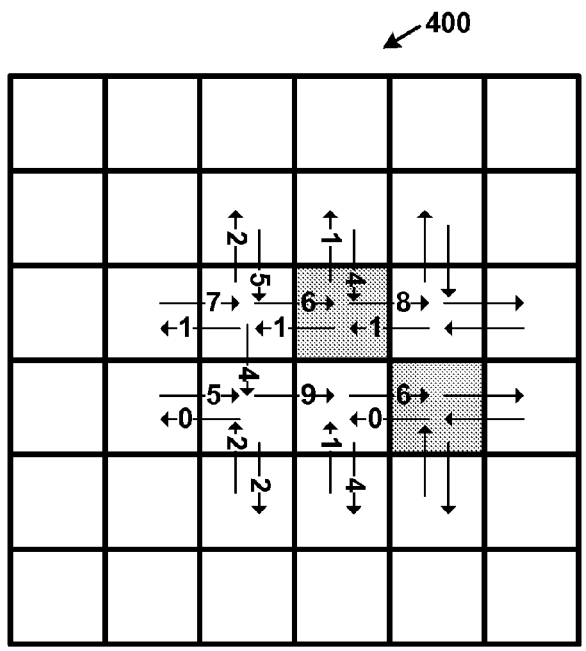
FIG. 4H illustrates the region of FIG. 4A with fleet plans for the sub-regions of FIG. 4F merged.
Figure 4I:
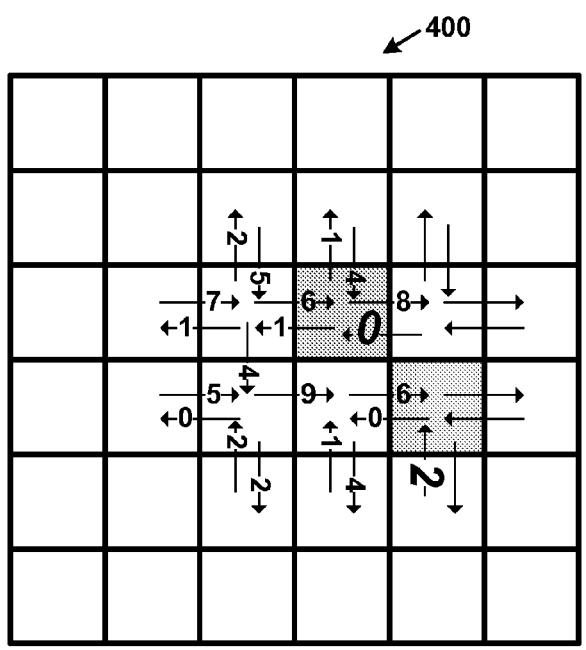
FIG. 4I illustrates an example merged and resolved fleet plan for the region of FIG. 4A.

FIG. 4H illustrates the region 400 with fleet plans for the sub-regions 402 and 404 merged. In this example, a conflict is present in the shaded cells. For example, the top shaded cell has estimates of 11 balloons entering the cell and 10 balloons leaving. The bottom shaded cell has 6 balloons entering; however, estimates for the sub-region determined in FIG. 4F were for only 4 balloons to enter. The estimates for a number of balloons entering and leaving each cell shown in FIG. 4H may be input to a linear program solver, as described below with reference to FIGS. 5-13, to use the inconsistent solution in FIG. 4H as initial guesses to arrive at a proper solution FIG. 4I illustrates an example merged and resolved fleet plan for the region of FIG. 4A. For example, in FIG. 4I, a number of balloons leaving the top-shaded cell has been changed to zero, and a number of balloons entering the bottom-shaded cell has been increased by 2.

Using examples shown in FIGS. 4A-4I, solving for each sub-region fleet plan, and combining the sub-region fleet plans for a comprehensive region fleet plan may result in a region fleet plan more quickly than solving for a comprehensive fleet plan independently. The sub-region fleet plans may be taken as initial solutions for the comprehensive fleet plan, and can be input to a linear solver as better estimates of an optimal solution than a random initial solution.

Figure 5:
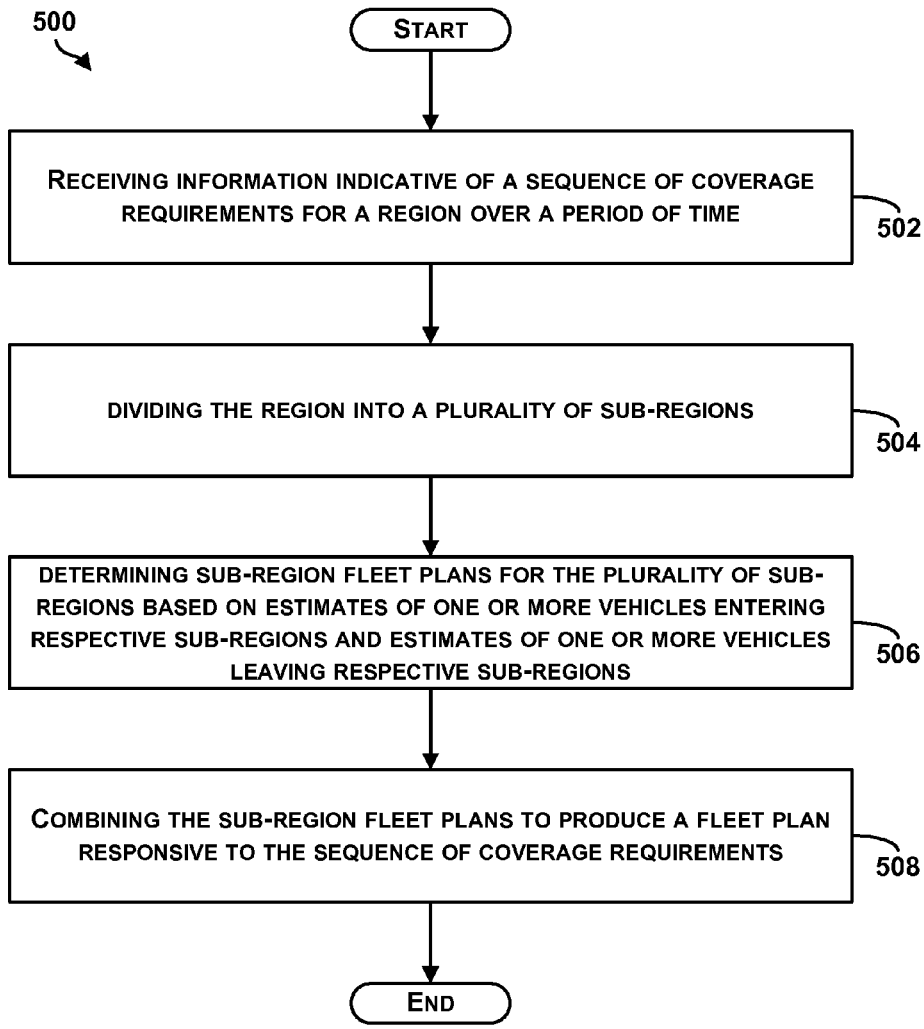
FIG. 5 is an example block diagram of a method for performing fleet planning of a region, in accordance with at least some embodiments described herein.

FIG. 5 is an example block diagram of a method for performing fleet planning of a region, in accordance with at least some embodiments described herein. Method 500 shown in FIG. 5 presents an embodiment of a method that, for example, could be used with the balloon networks 100 and 204, for example, and may be performed by a device, a server, a control station, a balloon, or a combination of any components of the balloon networks 100 and 204. Method 500 may include one or more operations, functions, or actions as illustrated by one or more of blocks 502-508. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 500 and other processes and methods disclosed herein, each block in FIG. 5 may represent circuitry that is wired to perform the specific logical functions in the process.

At block 502, the method 500 includes receiving information indicative of a sequence of coverage requirements for a region over a period of time. The region may be characterized by a plurality of landmarks and the period of time may be divided into a plurality of time intervals. An individual coverage requirement identifies a desired number of vehicles of a plurality of vehicles for each of the plurality of landmarks at a given time interval. Note that the number of vehicles may be a minimum number of vehicles that is desired for each of the plurality of landmarks, and in some instances, it may be acceptable to have more than the minimum number of vehicles at each landmark. Additionally, in some instances, the minimum number of vehicles may be zero for one or more landmarks and/or one or more phases.

In one example, the vehicles include balloons configured to provide a data network, and a region may include any area, such as a city, a state, a country, or the Earth. Landmarks of a region may be locations within the region designated by a predetermined amount of distance between the locations. The sequence of coverage requirements may indicate, as one example, that six balloons are desired at a first location in two hours, seven balloons are desired at a second locations in four hours, and so on.

At block 504, the method 500 includes, dividing the region into a plurality of sub-regions. A processor may divide the region into equal parts or into sub-regions of various sizes. A size of a sub-region may be based on local boundaries of an area in which the region resides. For example, for a global region, sub-regions may be divided based on boundaries of continents. For other smaller regions, sub-regions may be divided based on city, county, state, or country boundaries. In other examples, sub-regions may have a size based on a distance that a balloon may travel during one or more time intervals.

At block 506, the method 500 includes, determining sub-region fleet plans for the plurality of sub-regions based on estimates of one or more vehicles entering respective sub-regions and estimates of one or more vehicles leaving respective sub-regions. A given sub-region fleet plan may indicate one or more landmarks for one or more vehicles to travel to during one or more phases.

In one example, a sub-region fleet plan may be determined by determining vehicles of the plurality of vehicles that can reach a given landmark in a given sub-region by an end of the one or more time intervals. Put another way, a processor may be configured to determine estimated landmarks that can be reached by a vehicle during a time interval. A processor may perform the determination by receiving information about respective starting locations of each of the vehicles, and determine vehicles that can traverse a distance from the respective starting locations to the given landmark by the end of the one or more time intervals. In an example where the vehicles include balloons within a data network operable to provide data communication via optical or radio-frequency (RF) links, information about an estimated wind direction and speed at given altitudes can be determined, and then a distance and direction that the balloons would travel based on the estimated wind direction and speed at the given altitudes can be estimated. A sub-region where the balloons would reside by traveling the estimated distance and direction can then be identified.

In one example, making the determination in block 506 may be considered determining a phase fleet plan (e.g., describing a fleet plan for a phase of the time period). To determine a phase fleet plan of a time interval, information of the phase fleet plan of a subsequent time interval may be considered. Thus, a phase fleet plan for a final time interval may be determined first, and fleet plans for previous time intervals can be determined in reverse order. In one example, a backward planner may be used to determine a measure of how close to a target location that a balloon could reach if the balloon was starting at another location within a region, and additional details are provided below.

In some examples, for a time interval, estimates of end-of-interval positions for vehicles within sub-regions can be determined, and used as initial interval positions for the vehicles for a subsequent time interval. In other examples, estimates of initial interval positions for the vehicles within sub-regions can be determined and used as estimates as end-of-interval positions for a previous time interval.

Further examples for performing functions of block 506 are described below with reference to FIGS. 6-13.

At block 508, the method 500 includes, combining the sub-region fleet plans to produce a fleet plan responsive to the sequence of coverage requirements for the region. A processor may combine the sub-region fleet plans to generate the fleet plan by determining which vehicles may be able to satisfy the coverage requirements by traversing sub-regions over requisite time intervals. The fleet plan may include information indicating which vehicles should be directed to or through specified sub-regions, and to do so, the fleet plan may also indicate certain altitudes at which to direct the balloons to enable the balloons to travel a desired direction.

In some examples, a sub-region fleet plan indicates a number of vehicles entering the sub-region and a number of vehicles leaving the sub-region during respective phases, and for adjacent regions, a number of vehicles traversing a boundary may be resolved to be a given number of vehicles that are estimated to be leaving a first sub-region and entering a second sub-region at the boundary. In this way, when the sub-region fleet plans are combined, a number of vehicles available to enter the sub-region will be equal to the number of vehicles leaving an adjacent region. In other examples, for adjacent regions, a smaller of a number of vehicles leaving the first sub-region at the boundary and a number of vehicles entering the second sub-region at the boundary may be chosen.

In further examples, the sub-region fleet plans may be provided to a linear solver as inputs for an initial estimation of the fleet plan, and a processor may perform one or more iterations using the linear solver to produce the fleet plan for the region.

The method 500 may further include receiving updates about the vehicles, such as an updated location of one or more vehicles or an update in wind conditions of the region, and responsively regenerating the fleet plan or any sub-region fleet plans for the time intervals. In this example, when a change in wind conditions is received, and thus, a possible change in course of travel of balloons, a fleet plan may be regenerated.

The method 500 may further include providing instructions to the vehicles to operate according to the fleet plan. The method 500 may be performed by a ground-based station and instructions may be provided wirelessly to balloons, for example. In other instances, the method 500 (or portions thereof) can be performed by a processor residing on or coupled to the vehicle, and the processor can provide instructions to the vehicle (or to a control mechanism of the vehicle) to operate according to the fleet plan.

The method 500 may be executed to decompose vehicle fleet planning optimizations via spatial partitioning. Planning of trajectories of vehicles in the fleet may be performed per sub-region, and then trajectories of vehicles across boundaries of sub-regions can be resolved. Planning in this manner may be performed more quickly than planning an entire region serially.

Phase fleet planning, or generally fleet planning, may be performed using a number of example methods. Within examples, for a balloon trajectory from location A to location C, it is possible that there may be a wind at some altitude that could take a balloon from location A to location B, and wind at another altitude that could take the balloon from location B to location C. Thus, to traverse from location A to location C, an intermediate location B is needed. In other examples, to traverse from location A to location C may require passing from location A to location B1 to location B2 to location B3 and so on until arriving at location C. A number of possibilities grow with a number of "way-points" along a path. To control a fleet of balloons, a simultaneous plan of trajectory for many balloons at many starting locations may be needed, and each balloon may take a different path. In addition, goals other than a location or trajectory may constrain how to control balloons including minimizing time or energy used, or maximizing time present over areas of interest, such as highly populated regions for example.

Within examples, a system may be configured to receive (or determine) a starting location of each balloon of a fleet of balloons and receive a sequence of coverage requirements for the region or sub-regions of the region for a planning time period. As an example, the sequence of coverage requirements for the time period may specify a goal number of balloons for each of a plurality of landmarks within the region at various times T during the time period. The system may be configured to determine individual coverage requirements for sub-regions within the region. The system may also be configured to divide the time period into phases based on distinct values of T in the sequence of coverage requirements: a first phase may be defined from a starting time of the time period to an earliest T; a second phase may be defined between the end of the first phase and a second earliest T, etc. Additionally, a set of landmarks may be associated with the start and end of each phase: the start of the first phase may use the initial location of each of the balloons as landmarks; the end of the first phase and the start of the second phase may share the set of landmarks associated with the earliest T, etc.

Based on the received information, the system may be further configured to determine trajectories that satisfy the sequence of coverage requirements for the sub-regions. To determine the trajectories, the system may initially establish possible routes for balloons within each phase. For each landmark at the start of a phase and for each landmark at the end of the phase, the system may determine how close to the end-of-phase landmark that a balloon starting from the start-of-phase landmark could get by traveling during the phase.

Figure 6:
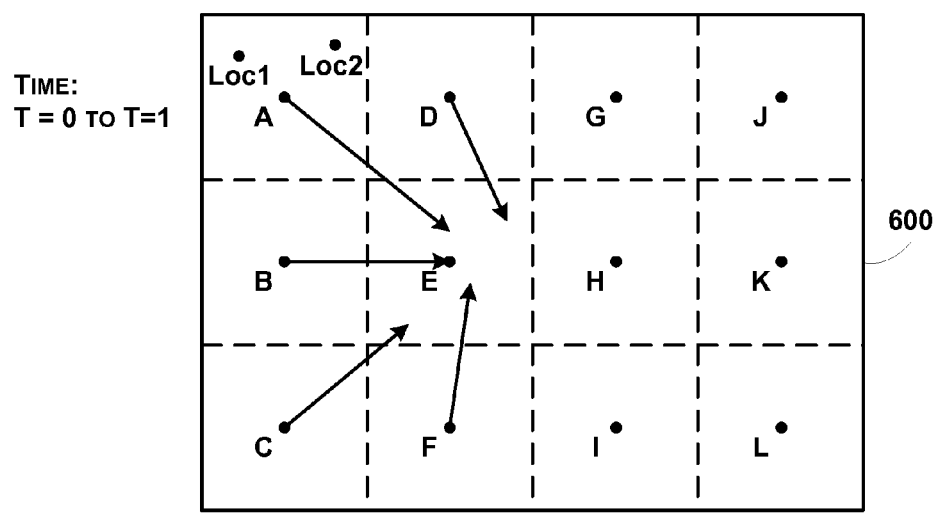
FIG. 6 illustrates example trajectories for a balloon that is traveling from a plurality of starting landmarks to a landmark E.

FIG. 6 illustrates example trajectories for a balloon that is traveling from a plurality of starting landmarks to a landmark E. Specifically, FIG. 6 illustrates trajectories from each of landmark A, B, C, D, and F to an ending landmark E. As shown in FIG. 6, a region 600 has been divided into a plurality of sub-regions, and the landmarks A-L have been established at the center of each sub-region. Note that in some examples coverage requirements may specify a goal number of balloons to be located at one or more locations within the region 600, and the goal number of balloons may be added to the nearest landmark to determine the goal number of balloons for each landmark. For example, if an individual coverage requirement indicates that five balloons are desired at location Loc1 and seven balloons are desired at location Loc2, the desired number of balloons for landmark A may be determined to be twelve.

Additionally, although the landmarks A-L have been distributed uniformly throughout the region 600, the example is not meant to be limiting. In other instances, landmarks may be non-uniformly distributed within the region 600. For example, if a region covers the entire Earth, one or more oceans or countries may not include any landmarks.

The example trajectories may be determined based on estimated or predicted wind conditions at one or more altitudes. In the example of FIG. 6, the wind conditions are assumed to generally include winds flowing from left-to-right with additional variation in the vertical direction from time T=0 to T=1. Therefore, it is assumed that a balloon could not flow from landmarks G-L to landmark E from time T=0 to T=1, and for convenience, only trajectories from landmarks A, B, C, D, and F are shown in FIG. 6.

In one example, a backward planner may be used to determine a measure of how close to a target location that a balloon could reach if the balloon was starting at another location within a region. For example, given a target time and target location as well as an initial time, the backward planner may be configured to determine, for a grid of starting locations within a region, a measure of how close to the target location a balloon could get, if the balloon was flying from initial time to target time.

Figure 7:
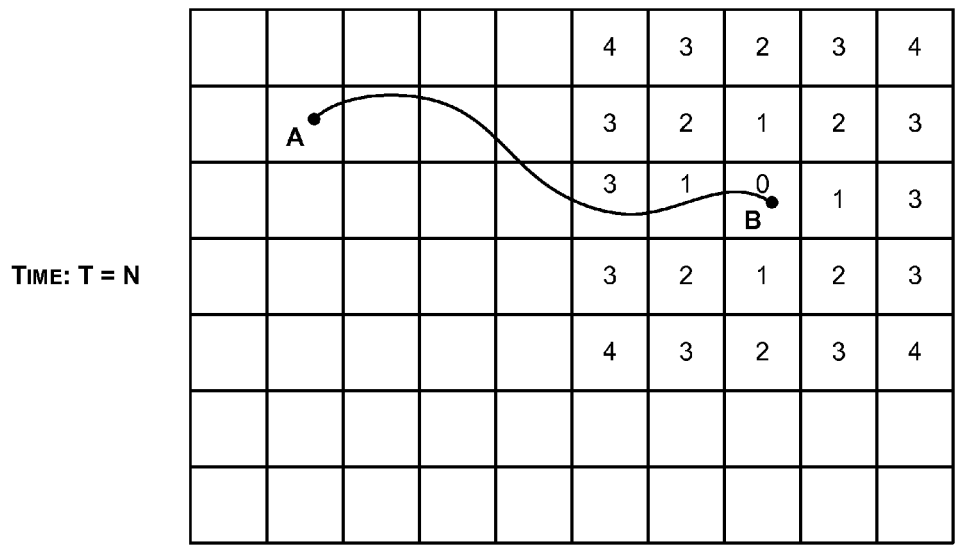
FIG. 7 illustrates an example cost value map where location A is a starting location of a balloon, location B is a desired final location, and example cost values are assigned to cells surrounding location B.

The backward planner may consider a problem of minimizing a cost function associated with a balloon path. As an example, the cost function may be a measure of how close a balloon gets to a target location by following a path. FIG. 7 illustrates an example cost value map where location A is a starting location of a balloon, location B is a desired final location, and example cost values are assigned to cells surrounding location B. For a time period from T=0 to T=N, the time period can be discretized in order to consider a situation of the balloon at times T=0, 1, 2, ..., N. The region can also be discretized by dividing the region into a finite number of cells. For instance, FIG. 7 illustrates a region that has been divided into a number of cells (e.g., a 10×7 grid of cells).

At time T=N (e.g., a final time of a planning phase), there is no planning to do since the balloon will be at a final location at this time, and a cost value can be assigned to each cell based on a final location of the balloon. For time T=N, cost values may be systematically assigned such that a cell in which the desired location resides has a low cost and cells further away may be assigned a higher cost value (e.g., the farther away from the desired location, the higher the cost value). Thus, as shown, a cell in which the desired location B resides can be assigned a cost value of zero, and cost values for surrounding cells can be assigned higher cost values based on a distance away from the desired location cell. Cost values for all cells can be populated in this manner by increasing the cost value for a given cell based on the distance from the desired location.

Following, cost value maps of all cells may be generated for each time step T=0, 1, 2, ..., N−1. To construct the cost value maps, a map may be generated for time T=N−1, and maps for previous times may be generated working backwards, such as next generating a map for time T=N−2, followed by T=N−3, and so on.

Figure 8:
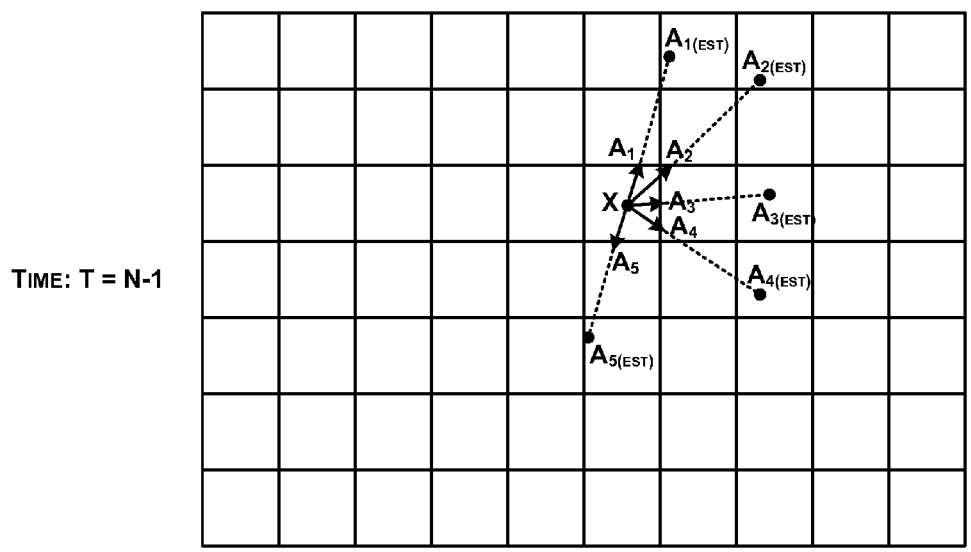
FIG. 8 illustrates estimated destination cells for a balloon starting at cell X, and moving with one of the five wind vectors $A_1$-$A_5$.

After generating the map at time T=N, to generate a map for a next previous time step, possible altitudes and corresponding possible locations that can be reached over the time interval from T=N−1 to T=N for a balloon present in every cell at time T=N−1 can be estimated. For each cell and for one or more altitudes, an estimation of where the balloon will arrive by starting at that cell and flying at that altitude during the time interval can be determined. For example, weather predictions at time T=N−1 may indicate that, for a given cell, different wind conditions exist for different altitudes. FIG. 8 illustrates an area divided into cells (e.g., a 10 by 7 grid of cells), and for a given cell labeled X, example wind vectors $A_1$-$A_5$ that are determined based on wind conditions at five different altitude levels.

In some examples, wind vectors associated with different altitudes may be the same for each cell. In other examples, wind vectors associated with different altitudes may vary based on the location of the cell. For each cell, an estimation of where a balloon would travel to (e.g., destination cell) at the end of the time period if the balloon started at the cell and moved with a given wind vector is determined. To do so, a direction and magnitude (e.g., speed) of the estimated wind vector can be used to estimate a trajectory and distance that the balloon travels, and to determine estimated destination cells (e.g., $A_{1(EST)}$-$A_{5(EST)}$). FIG. 8 illustrates estimated destination cells for a balloon starting at cell X, and moving with one of the five wind vectors $A_1$-$A_5$. Example simulations can be performed to simulate movement of the balloons due to the estimated wind directions and speed, for example.

In some examples, further estimations may be made by a balloon traveling at a first altitude for a portion of a time interval and then changing to a second altitude for a remainder of the time interval. It could be possible that by traveling at any given number of combinations of altitudes, the winds may be able to carry the balloon to a desired location over the time interval.

As shown in the example in FIG. 8, wind vector $A_3$ results in the balloon reaching a closest proximity to the desired final location B at time T=N. Cost values for the balloon traveling along the wind vectors $A_1$-$A_5$ may be determined based on the stored cost values at T=N for the destination cells $A_{1(EST)}$-$A_{5(EST)}$. For example, the wind vector $A_3$ may be assigned a value of zero, and cost values for a remainder of the wind vectors may be assigned higher cost values for causing the balloon to travel to a location further away from the desired destination (e.g., such as a $A_4$ having cost of one, $A_5$ having cost of four, $A_2$ having cost of two, and $A_1$ having cost of three).

An altitude that results in a smallest cost value can be determined, and the altitude and cost value can be stored for the cell X for time T=N−1. Thus, in the example described, for cell X at time T=N−1, a balloon in cell X that has a desired destination location B at time T=N can be instructed to travel at altitude $A_3$. The same determinations may be performed for each cell of the area.

The process above may be repeated to determine cost value maps for time interval T=N−2 based on prediction wind conditions for T=N−2 to T=N−1 and the stored cost values for T=N−1. Further, the process may be repeated for time intervals T=N−3, T=N−4, and so on until T=0. In some examples, each cell of a given map has estimates of directions that are based on estimates of directions as determined for a future time interval. This provides a feedback loop to plan at a first time interval for the balloon to take a given path so that the balloon will be at a location needed during the next time interval to take appropriate action, and so on.

Referring back to the example illustrated by FIG. 6, the backward planner may be able to determine, for each starting landmark A-L, a minimum distance from landmark E that a balloon could get, if the balloon was flying from T=0 to T=1. For example, a cost value for each of landmarks A-D and F-L may be proportional to a distance such that a given cost value can be converted to a given three-dimensional distance. The backward planner may also be able to determine, for each starting landmark A-D and F-L, which altitude a balloon should fly at T=0 in order to get as close as possible to the landmark E by T=1.

The backward planner is provided as one example mechanism for establishing possible routes between landmarks during a phase. However, other mechanisms that can determine, for a particular staring location/time and an ending location/time, how close to the ending location a balloon can get in the time period allotted, based on predicted wind velocities at one or more altitudes may also be utilized.

Figure 9A:
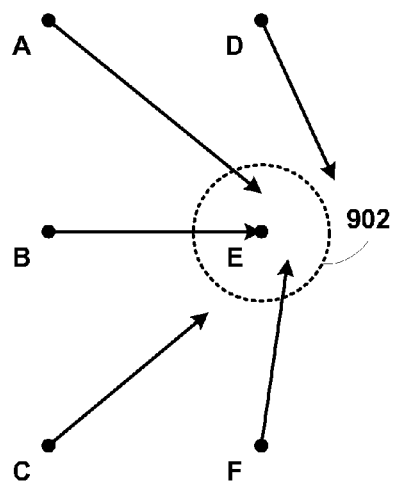
FIGS. 9A-9B illustrate examples of determining a set of starting landmarks from which a balloon could reach a landmark E.
Figure 9B:
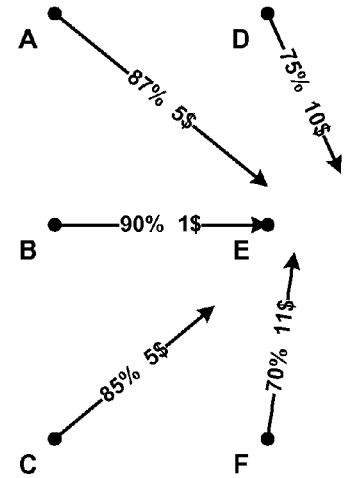

In some examples, filtering heuristics may also be applied to further refine the possible routes between landmarks during a phase. FIGS. 9A-9B illustrate examples of determining a set of starting landmarks from which a balloon could reach a landmark E.

In one example, thresholding may be used to impose a notion of how close to a target landmark that a balloon needs to be able to get in order to be considered to be capable of reaching the landmark. For example, a set of starting landmarks may be selected based on a comparison between the minimum distances associated with paths from landmarks A-D and F and a threshold distance. Based on the trajectories shown in FIG. 9A, balloons traveling from landmarks A, B, and F could get within a threshold distance 902 of the landmark E. Therefore, the landmarks A, B, and F may be retained as a set of starting landmarks from which a balloon could reach the landmark E, while the landmarks D and C may be removed.

In another example, a set of starting landmarks may be selected based on a confidence of reaching a target landmark from a starting landmark and/or a cost value associated with flying to the target landmark from a starting landmark. As shown in FIG. 9B, each path from starting landmarks A-D and F includes an associated probability, as indicated by a percentage on a scale of 1 to 100. The probability may be determined based on the variability of one or more wind conditions (e.g., wind direction and/or speed). In one example, based on the associated probabilities, landmarks A and B and C may be selected as a set of possible starting landmarks because their associated probabilities are greater than a confidence threshold (e.g., 85%).

Additionally, as shown in FIG. 9B, each path from starting landmarks A-D and F includes an associated cost, as indicated by a dollar amount. In one example, the cost may be associated with a cost in power that is necessary to adjust the altitude of a balloon to reach one or more altitudes during the path. Accordingly, a set of starting landmarks may be selected based on a comparison between the cost values associated with each starting landmark and a cost threshold. For instance, starting landmark B may be selected as the only possible starting landmark because the path associated with landmark B has the only associated cost that is below 3$.

In still another example, a set of starting landmarks may be determined from among the possible starting landmarks by retaining the top N number of starting landmarks (e.g., sorted to prefer minimum distances from within the target landmark that a balloon could get). It is contemplated that one or any combination of the described filtering heuristics may be used to determine a set of starting landmarks from which a target landmark may be reached.

Figure 10:
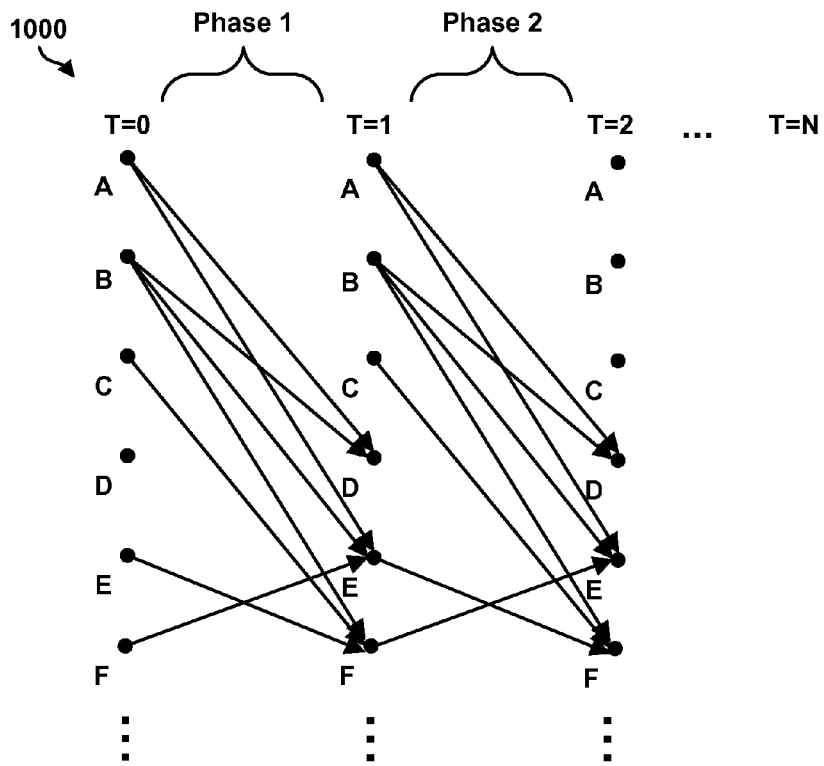
FIG. 10 illustrates an example graph of possible routes between a plurality of landmarks in accordance with an example embodiment.

FIG. 10 illustrates an example graph 1000 of possible routes between a plurality of landmarks in accordance with an example embodiment. Landmarks labeled A-F are provided. Each edge between two landmarks represents a trajectory a balloon could follow to get from a landmark at the beginning of a phase to a landmark at the end of the phase. For instance, a balloon at landmark A at time T=0 may be able to get to landmark D or E by time T=1. Additionally, a balloon at landmark A at time T=1 may be able to get to landmark D or E by time T=2. Note that although the edges for phase 1 are the same as the edges for phase 2 in FIG. 10, in other examples, edges may vary among phases.

Once the graph is constructed, an optimization method may be used to choose how many balloons flow across each connection in the graph (i.e., from each starting landmark to each ending landmark) during each phase. The optimization method may be configured to obey one or more consistency constraints. For example, a number of vehicles leaving a landmark in phase P may be set to be the same as the number of balloons that arrived at that landmark at the end of phase P−1. As another example, a number of vehicles at any landmark or traveling along any edge cannot be negative.

If the sequence of coverage requirements is treated as strict requirements, the problem of determining trajectories for the fleet may be considered a constraint satisfaction problem, where optimization means solving the constraint graph subject to the constraint that each goal is satisfied. If it is allowable to sometimes leave some goals unsatisfied, the problem may be considered an optimization problem: find the configuration that, for example, minimizes the number of unsatisfied goals, or some other measure of the goals' dissatisfaction.

Such a problem can be solved using a variety of methods, including as a linear program, as a minimum-cost-flow problem, via gradient descent, via stochastic optimization, or using other existing or future developed methods.

For instance, the problem may be solved as a linear program. In one case, the goal for the linear program is to take a time-varying description of how many balloons are desired at each landmark ("the goal distribution") that may be known from the sequence of coverage requirements, the initial location of each balloon, and a summary of which goal landmarks are reachable from which other landmarks at a given time, along with a measure of how accurately a balloon can be expected to reach a goal landmark, and determine a fleet-wide policy that maximizes a likelihood of satisfying the goal distribution. Note that the goal distribution is not concerned with determining where any particular balloon goes, but rather that the correct numbers of balloons are in the correct areas at each phase.

To solve the problem as a linear program, constants, variables, and constraints may be defined.

The constants may include:
startingAtOrigin[origin]=the initial distribution; the number of balloons at each location at the beginning of a planning period
requiredAtGoal[phase, goal]=the goal distribution; how many balloons desired at each goal at the end of each phase
score[phase, origin, goal]=accuracy estimate for the path from origin to goal during phase.

The variables may include:
A [phase, origin, goal]=how many vehicles move from origin to goal during phase; defined only if it is possible to reach the goal from the origin given the wind at that phase.
atGoal[phase, goal]=the number of balloons at goal at the end of phase
deficit[phase, goal]=the number of balloons by which the goal distribution was under-satisfied at goal at the of phase, that is: max(0, requiredAtGoal-atGoal).

The constraints may include:
Non-negative flow
$\forall$origin, $\forall$goal, $\forall$phase: $0 \leq$ A[phase, origin, goal]
Conservation on the origin side
$\forall$origin: $\Sigma_{goal}$ A[0, origin, goal]=startingAtOrigin[origin]
$\forall$origin, $\forall$phase>0: $\Sigma_{goal}$ A[phase, origin, goal]=atGoal[phase−1, origin]
Conservation on the goal side
$\forall$goal, $\forall$phase: atGoal[phase, goal]=$\Sigma_{origin}$ A[phase, origin, goal]
Non-negative deficits
$\forall$goal, $\forall$phase: $0 \leq$ deficit[phase, goal]
$\forall$goal, $\forall$phase: requiredAtGoal[phase, goal]$\leq$atGoal[phase, goal]++deficit[phase, goal]

Based on the constants, variables, and constraints defined above, a linear program solver may be used to minimize the example objective function shown below:

$$\alpha * c_{error}(\Sigma_{phase}\Sigma_{goal}\text{deficit}[\text{phase,goal}])+(1-\alpha)(\Sigma_{phase}\Sigma_{origin}\Sigma_{goal}\text{score}[\text{phase,origin,goal}]A[\text{phase,origin,goal}])$$

The objective function penalizes fleet plans that put less than the minimum number of balloons at some landmark; for each balloon fewer than desired, the penalty goes up. The optimal plan, therefore, is the plan that minimizes the objective function. An additional term can also be included that minimizes a measure of how close to a target landmark that each balloon can get. For instance, the additional term seeks to minimize the sum of the score constant for each path traversed. The additional term causes the linear program solver to prefer accurate trajectories and penalize trajectories that do not reliably deliver the balloon directly to a goal landmark.

In the example objective function, $c_{error}$, is a weight parameter and $\alpha$ may be another parameter that is used to adjust the relative importance of minimizing the number of missed goals versus preferring accurate trajectories. For instance, increasing $\alpha^*c_{error}$ may cause the linear program solver to prefer fleet trajectories that satisfy a goal distribution better, at the cost of being willing to use less accurate flight paths. Also, increasing $(1-\alpha)$ may cause the linear program solver to prefer fleet plans that use accurate/reliable flight paths, at the cost of being willing to leave more of a goal distribution unsatisfied.

In further examples, the score constant may be a measure of a confidence associated with whether a balloon traveling from origin could reach goal during phase. For instance, the measure of confidence may be a probability that is determined based on the variability of one or more wind conditions (e.g., wind direction and/or speed). In addition, the configuration of the linear program could further be modified such that the number of balloons atGoal is an expected number of balloons that is determined based on the probabilities of each balloon reaching the goal landmark. For example, if a balloon has a 75% chance of reaching a goal landmark, the balloons contribution to atGoal may be 0.75 balloons instead of 1 balloon.

In another variant, the score constant may be replaced or augmented with a measure of cost associated with a path from origin to goal during phase. For instance, the cost may be a cost-in-dollars, cost-in-power, or other cost measure. The linear program solver may then be configured to minimize total cost in the determined trajectories.

Within examples, the linear program solver may be used to minimize the example objective function for each sub-region of a region. For solving solutions for given sub-regions based on known or estimated numbers of balloons entering or leaving the sub-region, additional constants, variables, and constraints may be added to the objective function. Subsequently, solutions for sub-regions can be combined by considering variables representing flows of balloons that span sub-regions, and conflicts between variable values across two sub-regions can be resolved. For example, a corresponding variable in the objective function for a first sub-region can be initialized to a minimum, a maximum, a mean, a sum, a random choice, or other reconciliation of values of the two sub-regions or the variable can be uninitialized as well.

Example additional constants to consider may include:
Min_Enter_Subregion[phase, origin, goal]=the minimum number of balloons that enter the sub-region from origin during phase.
Max_Enter_Subregion[phase, origin, goal]=the maximum number of balloons that enter the sub-region from origin during phase.
Min_Leave_Subregion[phase, origin, goal]=the minimum number of balloons that leave the sub-region from origin during phase.
Max_Leave_Subregion[phase, origin, goal]=the maximum number of balloons that leave the sub-region from origin during phase.
Example additional variables may include:
Enter_Subregion[phase, origin, goal]=how many balloons entered from origin to goal during phase.
Leave_Subregion[phase, origin, goal]=how many balloons left from origin to goal during phase.
Example alternative constraints may include:
Constrain sub-region boundary crossings
$\forall$phase, $\forall$origin, $\forall$goal: Min_Enter_Subregion[phase, origin, goal]≤Enter_Subregion[phase, origin, goal] ≤Max_Enter_Subregion[phase, origin, goal]
$\forall$phase, $\forall$origin, $\forall$goal: Min_Leave_Subregion[phase, origin, goal]≤Leave_Subregion[phase, origin, goal] ≤Max_Leave_Subregion[phase, origin, goal]
Conservation on the origin side
$\forall$origin: ($\Sigma_{goal}$ A[0, origin, goal]+$\Sigma_{goal}$ Leave_Subregion [0, origin, goal])=startingAtOrigin[origin]
$\forall$origin, $\forall$phase>0: ($\Sigma_{goal}$ A[phase, origin, goal]+$\Sigma_{goal}$ Leave_Subregion[phase, origin, goal])=atGoal[phase-1, origin]
Conservation on the goal side
$\forall$goal, $\forall$phase: atGoal[phase, goal]=$\Sigma_{origin}$ A[phase, origin, goal]+$\Sigma_{origin}$ Enter_Subregion[phase, origin, goal]

The optimization problem may also be solved as a minimum-cost-flow problem. For instance, the linear program described above may be reduced to a minimum-cost-flow problem. A minimum-cost-flow problem seeks to find the least costly way of sending a certain amount of flow through a flow network. The flow network is often represented as a directed graph with one or more source nodes and one or more sink nodes. Every edge in the network then specifies a maximum capacity of flow for the edge and a positive cost per unit of flow.

Figure 11:
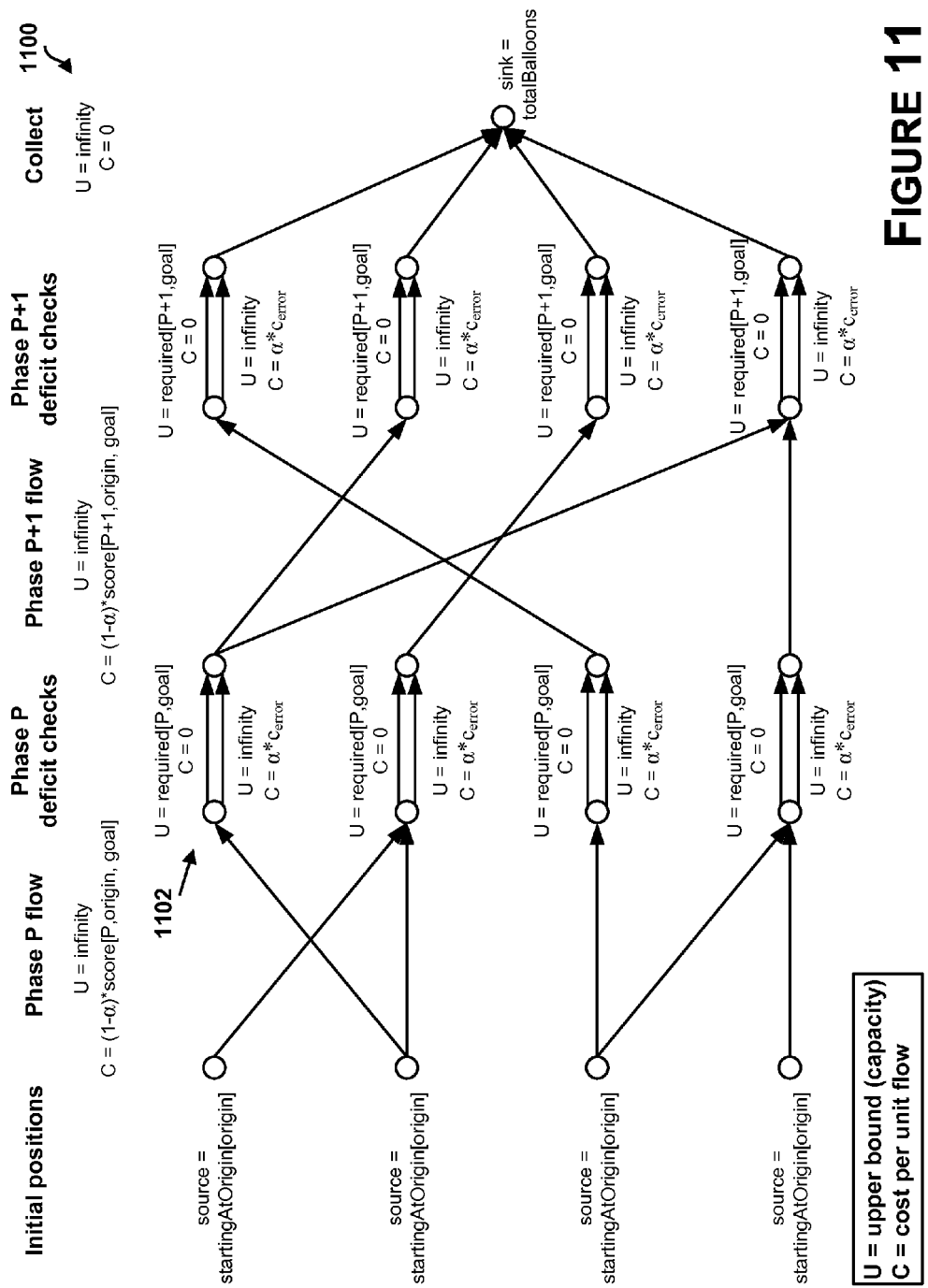
FIG. 11 illustrates an example directed graph in accordance with an example embodiment.

FIG. 11 illustrates an example directed graph 1100 in accordance with an example embodiment. The directed graph 1100 may be formed in a manner similar to the graph 1000 of FIG. 10. For convenience, only two phases, phase P and phase P+1, are shown. During "Phase P flow" and "Phase P+1 flow", each edge represents a path between two landmarks. These edges may be considered to all have unlimited capacity. The cost for these edges is used to penalize trajectories that do not reliably deliver a balloon directly to a goal landmark. Similar to the linear program described above, each edge has a cost of: $(1-\alpha)^*$score[phase, origin, goal].

Each initial balloon location is defined as a source node. Therefore, the number of balloons entering the directed graph 1100 corresponds to the number of balloons starting at that location. The directed graph 1100 also includes a sink node, where the number of balloons exiting the directed graph 1100 equals the total number of balloons in the fleet. This allows the balloons to end up in any configuration at the end of the final phase, then all get accounted for as exiting exactly once.

The minimum-cost-flow problem class can be configured to consider the physical constraints defined in the linear program as givens or initial inputs. In particular, non-negative flow and conservation of balloons may be required features for minimum-cost-flow problems.

To include consideration of deficits in the minimum-cost-flow problem, the directed graph 1100 includes a space to apply the deficit costs. Deficits are defined at the nodes in between phase flows by splitting each landmark node 1102 into two nodes. Two edges are then included between the two nodes. Specifically, FIG. 11 includes a "Phase P deficit checks" column and "Phase P+1 deficit checks" column, where each landmark node 1102 has been split into two nodes that are connected by two edges.

Figure 12:
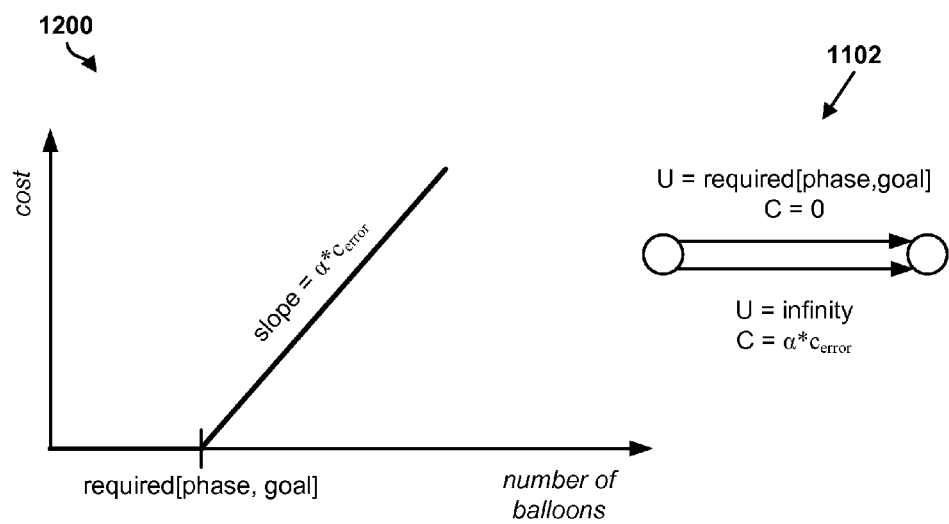
FIG. 12 illustrates an example piecewise linear cost function in accordance with an example embodiment.

The deficits can be defined according to a piecewise linear cost function. FIG. 12 illustrates an example piecewise linear cost function 1200 in accordance with an example embodiment. The piecewise linear cost function 1200 allows the minimum-cost-flow problem to account for unlimited capacity at the landmark node 1102. Because the cost of the top edge has a lower cost than the bottom edge, balloons will prefer to go across the top edge, up to the capacity limit of required[phase, goal] (which may be equal to requiredAtGoal as defined above). If more than a required number of balloons travel across the landmark node 1102, the additional balloons in excess of the desired number of balloons for the landmark node 1102 will incur a cost of $\alpha^*c_{error}$ while traveling across the infinite capacity bottom edge. Therefore, a solution to the minimum-cost-flow problem will seek to avoid having more than the desired number of balloons travel to each landmark node 1102.

Figure 13:
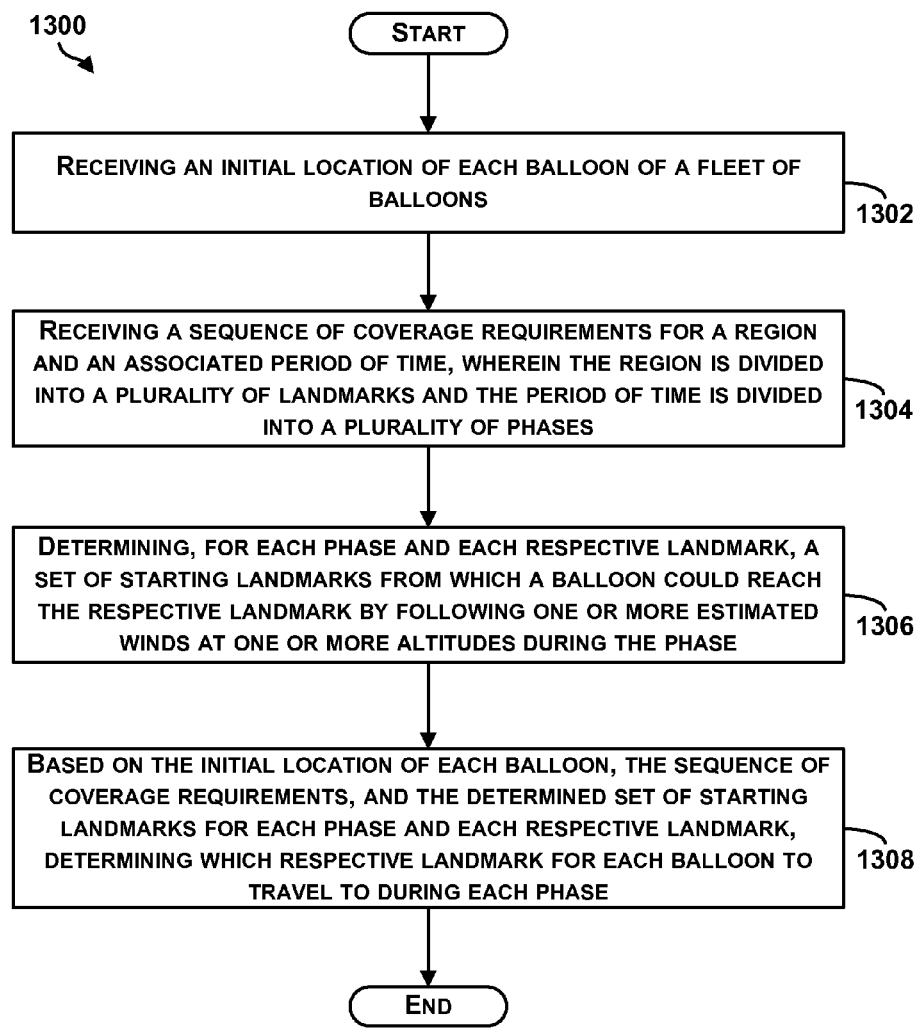
FIG. 13 is an example block diagram of a method to determine trajectories for a fleet of balloons, in accordance with at least some embodiments described herein.

FIG. 13 is an example block diagram of a method 1300 to determine trajectories for a fleet of balloons, in accordance with at least some embodiments described herein. At block 1302, the method 1300 includes receiving an initial location of each balloon of a fleet of balloons. At block 1304, the method 1300 includes receiving a sequence of coverage requirements for a region and an associated period of time. The region may be divided into a plurality of landmarks and the period of time may be divided into a plurality of phases. An individual coverage requirement may then specify a desired number of balloons for each of the plurality of landmarks at an end of a given phase.

At block 1306, the method 1300 includes determining, for each phase and each respective landmark, a set of starting landmarks from which a balloon could reach the respective landmark by following one or more estimated winds at one or more altitudes during the phase. For instance, a backward planner may be used to determine, for each landmark, a minimum distance from each other landmark that a balloon could get, if the balloon was following one or more predicted winds during the phase. At block 1308, the method 1300 includes, based on the initial location of each balloon, the sequence of coverage requirements, and the determined set of starting landmarks for each phase and each respective landmark, determining which respective landmark for each balloon to travel to during each phase. For instance, a linear objective function may be minimized to determine which respective landmark that each balloon should travel to. As another example, the determination regarding which respective landmark that each balloon should travel to during each phase may be made by solving a minimum-cost-flow problem.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   receiving information from a control system indicative of a sequence of coverage requirements for a data network for a region over a period of time, wherein the region is characterized by a plurality of landmarks and the period of time is divided into a plurality of phases, and wherein a given coverage requirement of the sequence of coverage requirements is indicative of a desired number of vehicles of a plurality of vehicles for respective landmarks at a given phase;
   dividing the region into a plurality of sub-regions;
   determining, by a processor of the control system, sub-region fleet plans for the plurality of sub-regions based on both estimates of one or more vehicles entering respective sub-regions and estimates of one or more vehicles leaving the respective sub-regions, wherein a given sub-region fleet plan of the determined sub-region fleet plans is indicative of one or more landmarks for the one or more vehicles to travel to during one or more phases of the plurality of phases, and indicates both a first number value of vehicles entering the given sub-region and a second number value of vehicles leaving the given sub-region during respective phases, and wherein the first number value of vehicles is different than the second number value of vehicles;
   combining, by the processor of the control system, the determined sub-region fleet plans to produce a fleet plan responsive to the sequence of coverage requirements for the region; and
   providing, by the processor of the control system, instructions to the one or more vehicles to travel according to the fleet plan.

2. The method of claim 1, further comprising:
   for the plurality of sub-regions, determining for one or more respective landmarks of the plurality of landmarks estimated landmarks of the plurality of landmarks that can be reached by a vehicle starting from the one or more respective landmarks; and
   based on the sequence of coverage requirements, determining which landmarks of the estimated landmarks for the vehicle to travel to during a respective phase to generate the sub-region fleet plans.

3. The method of claim 1, wherein combining the sub-region fleet plans to produce the fleet plan comprises:
   for sub-region fleet plans corresponding to a first sub-region and a second sub-region of the plurality of sub-regions that are adjacent regions, at a boundary of the adjacent regions resolving a number of vehicles traversing the boundary to be a given number of vehicles that are estimated to be leaving the first sub-region at the boundary.

4. The method of claim 1, wherein a first sub-region and a second sub-region of the plurality of regions are adjacent regions, and wherein vehicles traverse from the first sub-region to the second sub-region, and wherein combining the sub-region fleet plans to produce the fleet plan responsive to the sequence of coverage requirements for the region comprises:
   at a boundary of the adjacent regions, resolving a number of vehicles traversing the boundary to be a smaller of a number of vehicles leaving the first sub-region at the boundary and a number of vehicles entering the second sub-region at the boundary.

5. The method of claim 1, wherein combining the sub-region fleet plans to produce the fleet plan comprises:
   providing the sub-region fleet plans to a linear solver as inputs for an initial configuration of vehicles of the plurality of vehicles; and
   performing one or more iterations using the linear solver to produce the fleet plan for the region.

6. The method of claim 1, wherein the region includes Earth, and wherein dividing the region into a plurality of sub-regions comprises dividing the Earth into regions comprising continents.

7. The method of claim 1, wherein vehicles of the plurality of vehicles include a balloon within a data network that is operable to provide data communication via optical or radio-frequency (RF) links.

8. The method of claim 7, further comprising:
for the plurality of sub-regions, determining for one or more respective landmarks of the plurality of landmarks estimated landmarks of the plurality of landmarks that can be reached by the balloon starting from the one or more respective landmarks and by following one or more estimated winds at one or more altitudes.

9. A non-transitory computer readable storage medium having stored therein instructions, that when executed by a computing device, cause the computing device to perform functions comprising:
receiving information from a control system indicative of a sequence of coverage requirements for a data network for a region over a period of time, wherein the region is characterized by a plurality of landmarks and the period of time is divided into a plurality of phases, and wherein a given coverage requirement of the sequence of coverage requirements is indicative of a desired number of vehicles of a plurality of vehicles for respective landmarks at a given phase;
dividing the region into a plurality of sub-regions;
determining sub-region fleet plans for the plurality of sub-regions based on both estimates of one or more vehicles entering respective sub-regions and estimates of one or more vehicles leaving the respective sub-regions, wherein a given sub-region fleet plan of the determined sub-region fleet plans is indicative of one or more landmarks for the one or more vehicles to travel to during one or more phases of the plurality of phases, and indicates both a first number value of vehicles entering the given sub-region and a second number value of vehicles leaving the given sub-region during respective phases, and wherein the first number value of vehicles is different than the second number value of vehicles;
combining the determined sub-region fleet plans to produce a fleet plan responsive to the sequence of coverage requirements for the region; and
providing instructions to the one or more vehicles to travel according to the fleet plan.

10. The non-transitory computer readable storage medium of claim 9, wherein the functions further comprise:
for the plurality of sub-regions, determining for one or more respective landmarks of the plurality of landmarks estimated landmarks of the plurality of landmarks that can be reached by a vehicle starting from the one or more respective landmarks; and
based on the sequence of coverage requirements, determining which landmarks of the estimated landmarks for the vehicle to travel to during a respective phase to generate the sub-region fleet plans.

11. The non-transitory computer readable storage medium of claim 9, wherein combining the sub-region fleet plans to produce the fleet plan comprises:
for sub-region fleet plans corresponding to a first sub-region and a second sub-region of the plurality of sub-regions that are adjacent regions, at a boundary of the adjacent regions resolving a number of vehicles traversing the boundary to be a given number of vehicles that are estimated to be leaving the first sub-region at the boundary.

12. The non-transitory computer readable storage medium of claim 9, wherein a first sub-region and a second sub-region of the plurality of regions are adjacent regions, and wherein vehicles traverse from the first sub-region to the second sub-region, and wherein combining the sub-region fleet plans to produce the fleet plan responsive to the sequence of coverage requirements for the region comprises:
at a boundary of the adjacent regions, resolving a number of vehicles traversing the boundary to be a smaller of a number of vehicles leaving the first sub-region at the boundary and a number of vehicles entering the second sub-region at the boundary.

13. The non-transitory computer readable storage medium of claim 9, wherein combining the sub-region fleet plans to produce the fleet plan comprises:
providing the sub-region fleet plans to a linear solver as inputs for an initial configuration of vehicles of the plurality of vehicles; and
performing one or more iterations using the linear solver to produce the fleet plan for the region.

14. The non-transitory computer readable storage medium of claim 9, wherein the region includes Earth, and wherein dividing the region into a plurality of sub-regions comprises dividing the Earth into regions comprising continents.

15. A system, comprising:
at least one processor; and
data storage comprising program instructions executable by the at least one processor to cause the at least one processor to perform functions comprising:
receiving information from a control system indicative of a sequence of coverage requirements for a data network for a region over a period of time, wherein the region is characterized by a plurality of landmarks and the period of time is divided into a plurality of phases, and wherein a given coverage requirement of the sequence of coverage requirements is indicative of a desired number of vehicles of a plurality of vehicles for respective landmarks at a given phase;
dividing the region into a plurality of sub-regions;
determining sub-region fleet plans for the plurality of sub-regions based on both estimates of one or more vehicles entering respective sub-regions and estimates of one or more vehicles leaving the respective sub-regions, wherein a given sub-region fleet plan of the determined sub-region fleet plans is indicative of one or more landmarks for the one or more vehicles to travel to during one or more phases of the plurality of phases, and indicates both a first number value of vehicles entering the given sub-region and a second number value of vehicles leaving the given sub-region during respective phases, and wherein the first number value of vehicles is different than the second number value of vehicles;
combining the determined sub-region fleet plans to produce a fleet plan responsive to the sequence of coverage requirements for the region; and
providing instructions to the one or more vehicles to travel according to the fleet plan.

16. The system of claim 15, wherein vehicles of the plurality of vehicles include a balloon within a data network that is operable to provide data communication via optical or radio-frequency (RF) links.

17. The system of claim 16, wherein the functions further comprise: for the plurality of sub-regions, determining for one or more respective landmarks of the plurality of landmarks estimated landmarks of the plurality of landmarks that can be reached by the balloon starting from the one or more respective landmarks and by following one or more estimated winds at one or more altitudes.

18. The system of claim 15, wherein combining the sub-region fleet plans to produce the fleet plan comprises:
providing the sub-region fleet plans to a linear solver as inputs for an initial configuration of vehicles of the plurality of vehicles; and performing one or more iterations using the linear solver to produce the fleet plan for the region.

* * * * *